(12) United States Patent
Pope et al.

(10) Patent No.: US 11,134,140 B2
(45) Date of Patent: Sep. 28, 2021

(54) TCP PROCESSING FOR DEVICES

(71) Applicant: Xilinx, Inc., San Jose, CA (US)

(72) Inventors: Steve L. Pope, Cambridge (GB); David J. Riddoch, Fenstanton (GB)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 15/481,350

(22) Filed: Apr. 6, 2017

(65) Prior Publication Data

US 2017/0214775 A1 Jul. 27, 2017

Related U.S. Application Data

(63) Continuation of application No. 14/231,510, filed on Mar. 31, 2014, now Pat. No. 9,674,318, which is a continuation-in-part of application No. 13/754,792, filed on Jan. 30, 2013, now Pat. No. 10,873,613, which is a continuation-in-part of application No. 13/624,788, filed on Sep. 21, 2012, now Pat. No. 9,003,053, and a continuation-in-part of application
(Continued)

(51) Int. Cl.
| | |
|---|---|
| *G06F 15/16* | (2006.01) |
| *H04L 29/06* | (2006.01) |
| *H04L 29/08* | (2006.01) |
| *H04L 12/18* | (2006.01) |
| *G06Q 40/04* | (2012.01) |

(52) U.S. Cl.
CPC ............ *H04L 69/16* (2013.01); *G06Q 40/04* (2013.01); *H04L 12/1804* (2013.01); *H04L 69/22* (2013.01); *H04L 69/321* (2013.01); *H04L 69/326* (2013.01)

(58) Field of Classification Search
CPC ..... G06Q 40/04; H04L 12/1804; H04L 69/16; H04L 69/22; H04L 69/321; H04L 69/326
See application file for complete search history.

(56) References Cited

U.S. PATENT DOCUMENTS

| | | |
|---|---|---|
| 4,905,234 A | 2/1990 | Childress et al. |
| 5,272,599 A | 12/1993 | Koenen |
| (Continued) | | |

FOREIGN PATENT DOCUMENTS

| | | |
|---|---|---|
| EP | 0620521 A2 | 10/1994 |
| EP | 2463782 A2 | 6/2012 |
| (Continued) | | |

OTHER PUBLICATIONS

U.S. Appl. No. 15/287,666, filed Oct. 6, 2016, Pope et al.
(Continued)

*Primary Examiner* — June Y Sison
*Assistant Examiner* — Dixon F Dabipi
(74) *Attorney, Agent, or Firm* — Wolf, Greenfield & Sacks, P.C.

(57) ABSTRACT

A data processing system is provided. A host processing device supports a host transport engine operable to establish a first transport stream over a network with a remote peer. Device hardware comprises a device transport engine. The device transport engine is configured to monitor the first transport stream to determine a state of the first transport stream and in response to an indication from the host processing device perform transport processing of the first transport stream.

41 Claims, 5 Drawing Sheets

Related U.S. Application Data

No. 13/283,420, filed on Oct. 27, 2011, now Pat. No. 9,258,390, and a continuation-in-part of application No. 13/671,434, filed on Nov. 7, 2012, now Pat. No. 9,600,429, which is a continuation-in-part of application No. 12/964,642, filed on Dec. 9, 2010, now Pat. No. 8,996,644.

(60) Provisional application No. 61/714,405, filed on Oct. 16, 2012, provisional application No. 61/538,055, filed on Sep. 22, 2011, provisional application No. 61/513,108, filed on Jul. 29, 2011, provisional application No. 61/714,405, filed on Oct. 16, 2012.

(56) References Cited

U.S. PATENT DOCUMENTS

| | | | |
|---|---|---|---|
| 5,325,532 A | 6/1994 | Crosswy et al. | |
| 5,612,950 A | 3/1997 | Young | |
| 5,937,169 A | 8/1999 | Connery et al. | |
| 5,946,189 A | 8/1999 | Koenen et al. | |
| 6,098,112 A | 8/2000 | Ishijima et al. | |
| 6,160,554 A | 12/2000 | Krause | |
| 6,173,333 B1* | 1/2001 | Jolitz | H04L 29/06 709/238 |
| 6,304,945 B1 | 10/2001 | Koenen | |
| 6,349,035 B1 | 2/2002 | Koenen | |
| 6,427,173 B1 | 7/2002 | Boucher et al. | |
| 6,438,130 B1 | 8/2002 | Kagan et al. | |
| 6,502,203 B2 | 12/2002 | Barron et al. | |
| 6,530,007 B2 | 3/2003 | Olarig et al. | |
| 6,591,302 B2* | 7/2003 | Boucher | H04L 29/06 709/230 |
| 6,594,787 B1 | 7/2003 | Chesson | |
| 6,667,918 B2 | 12/2003 | Leader et al. | |
| 6,718,392 B1 | 4/2004 | Krause | |
| 6,728,743 B2 | 4/2004 | Shachar | |
| 6,735,642 B2 | 5/2004 | Kagan et al. | |
| 6,768,996 B1 | 7/2004 | Steffens et al. | |
| 6,904,534 B2 | 6/2005 | Koenen | |
| 6,907,042 B1 | 6/2005 | Oguchi | |
| 6,950,961 B2 | 9/2005 | Krause et al. | |
| 6,965,941 B2 | 11/2005 | Boucher et al. | |
| 6,978,331 B1 | 12/2005 | Kagan et al. | |
| 7,089,326 B2 | 8/2006 | Boucher et al. | |
| 7,093,158 B2 | 8/2006 | Barron et al. | |
| 7,099,275 B2 | 8/2006 | Sarkinen et al. | |
| 7,103,626 B1 | 9/2006 | Recio et al. | |
| 7,103,744 B2 | 9/2006 | Garcia et al. | |
| 7,136,397 B2 | 11/2006 | Sharma | |
| 7,143,412 B2 | 11/2006 | Koenen | |
| 7,149,227 B2 | 12/2006 | Stoler et al. | |
| 7,151,744 B2 | 12/2006 | Sarkinen et al. | |
| 7,165,112 B2 | 1/2007 | Battin et al. | |
| 7,216,225 B2 | 5/2007 | Haviv et al. | |
| 7,240,350 B1 | 7/2007 | Eberhard et al. | |
| 7,245,627 B2 | 7/2007 | Goldenberg et al. | |
| 7,254,237 B1 | 8/2007 | Jacobson et al. | |
| 7,285,996 B2 | 10/2007 | Fiedler | |
| 7,316,017 B1 | 1/2008 | Jacobson et al. | |
| 7,346,702 B2 | 3/2008 | Haviv | |
| 7,386,619 B1 | 6/2008 | Jacobson et al. | |
| 7,403,535 B2 | 7/2008 | Modi et al. | |
| 7,404,190 B2 | 7/2008 | Krause et al. | |
| 7,451,456 B2 | 11/2008 | Andjelic | |
| 7,502,826 B2 | 3/2009 | Barron et al. | |
| 7,502,870 B1 | 3/2009 | Chu | |
| 7,509,355 B2 | 3/2009 | Hanes et al. | |
| 7,518,164 B2 | 4/2009 | Smelloy et al. | |
| 7,551,614 B2 | 6/2009 | Teisberg et al. | |
| 7,554,993 B2 | 6/2009 | Modi et al. | |
| 7,573,967 B2 | 8/2009 | Fiedler | |
| 7,580,415 B2 | 8/2009 | Hudson et al. | |
| 7,580,495 B2 | 8/2009 | Fiedler | |
| 7,617,376 B2 | 11/2009 | Chadalapaka et al. | |
| 7,631,106 B2 | 12/2009 | Goldenberg et al. | |
| 7,636,703 B2 | 12/2009 | Taylor | |
| 7,650,386 B2 | 1/2010 | McMahan et al. | |
| 7,653,754 B2 | 1/2010 | Kagan et al. | |
| 7,688,838 B1 | 3/2010 | Aloni et al. | |
| 7,688,853 B2 | 3/2010 | Santiago et al. | |
| 7,702,629 B2 | 4/2010 | Cytron et al. | |
| 7,725,556 B1 | 5/2010 | Schlansker et al. | |
| 7,751,398 B1 | 7/2010 | Veprinsky et al. | |
| 7,757,232 B2 | 7/2010 | Hilland et al. | |
| 7,801,027 B2 | 9/2010 | Kagan et al. | |
| 7,802,071 B2 | 9/2010 | Oved | |
| 7,813,460 B2 | 10/2010 | Fiedler | |
| 7,827,442 B2 | 11/2010 | Sharma et al. | |
| 7,835,375 B2 | 11/2010 | Sarkinen et al. | |
| 7,835,380 B1* | 11/2010 | Aloni | H04L 12/413 370/394 |
| 7,848,322 B2 | 12/2010 | Oved | |
| 7,856,488 B2 | 12/2010 | Cripe et al. | |
| 7,864,787 B2 | 1/2011 | Oved | |
| 7,895,445 B1 | 2/2011 | Albanese et al. | |
| 7,904,576 B2 | 3/2011 | Krause et al. | |
| 7,921,178 B2 | 4/2011 | Haviv | |
| 7,929,539 B2 | 4/2011 | Kagan et al. | |
| 7,930,437 B2 | 4/2011 | Kagan et al. | |
| 7,934,959 B2 | 5/2011 | Rephaeli et al. | |
| 7,945,528 B2 | 5/2011 | Cytron et al. | |
| 7,954,114 B2 | 5/2011 | Chamberlain et al. | |
| 7,978,606 B2 | 7/2011 | Buskirk et al. | |
| 8,000,336 B2 | 8/2011 | Harel | |
| 8,156,101 B2 | 4/2012 | Indeck et al. | |
| 8,286,193 B2 | 10/2012 | Pope et al. | |
| 8,326,816 B2 | 12/2012 | Colle et al. | |
| 8,332,285 B1 | 12/2012 | Barua et al. | |
| 8,346,919 B1* | 1/2013 | Eiriksson | H04L 69/22 709/203 |
| 8,548,900 B1* | 10/2013 | Glackin | G06Q 40/06 705/37 |
| 8,996,644 B2 | 3/2015 | Pope | |
| 9,003,053 B2 | 4/2015 | Pope et al. | |
| 9,258,390 B2 | 2/2016 | Pope et al. | |
| 9,306,793 B1 | 4/2016 | Craft et al. | |
| 9,456,060 B2 | 9/2016 | Pope et al. | |
| 9,674,318 B2 | 6/2017 | Pope et al. | |
| 10,021,223 B2 | 7/2018 | Pope et al. | |
| 10,425,512 B2 | 9/2019 | Pope et al. | |
| 10,469,632 B2 | 11/2019 | Pope et al. | |
| 10,652,367 B2 | 5/2020 | Pope et al. | |
| 10,666,777 B2 | 5/2020 | Pope et al. | |
| 2001/0036184 A1 | 11/2001 | Kinoshita et al. | |
| 2001/0036196 A1 | 11/2001 | Blightman et al. | |
| 2002/0059052 A1 | 5/2002 | Bloch et al. | |
| 2002/0095519 A1 | 7/2002 | Philbrick et al. | |
| 2002/0107971 A1* | 8/2002 | Bailey | H04L 69/165 709/231 |
| 2002/0112139 A1 | 8/2002 | Krause et al. | |
| 2002/0129293 A1 | 9/2002 | Hutton et al. | |
| 2002/0140985 A1 | 10/2002 | Hudson | |
| 2002/0156784 A1 | 10/2002 | Hanes et al. | |
| 2002/0174240 A1 | 11/2002 | Nason et al. | |
| 2002/0198990 A1 | 12/2002 | Bradfield et al. | |
| 2003/0007165 A1 | 1/2003 | Hudson | |
| 2003/0033588 A1 | 2/2003 | Alexander | |
| 2003/0058459 A1 | 3/2003 | Wu et al. | |
| 2003/0063299 A1 | 4/2003 | Cowan et al. | |
| 2003/0065856 A1 | 4/2003 | Kagan et al. | |
| 2003/0081060 A1 | 5/2003 | Zeng et al. | |
| 2003/0086300 A1 | 5/2003 | Noyes et al. | |
| 2003/0140124 A1 | 7/2003 | Burns | |
| 2003/0172330 A1 | 9/2003 | Barron et al. | |
| 2003/0191786 A1 | 10/2003 | Matson et al. | |
| 2003/0202043 A1 | 10/2003 | Zeng et al. | |
| 2003/0214677 A1 | 11/2003 | Bhaskar et al. | |
| 2004/0015502 A1 | 1/2004 | Alexander et al. | |
| 2004/0054813 A1 | 3/2004 | Boucher et al. | |
| 2004/0071250 A1 | 4/2004 | Bunton et al. | |
| 2004/0073716 A1* | 4/2004 | Boom | H04L 69/12 709/250 |
| 2004/0141642 A1 | 7/2004 | Zeng et al. | |

(56) References Cited

U.S. PATENT DOCUMENTS

| | | |
|---|---|---|
| 2004/0156393 A1 | 8/2004 | Gupta et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210670 A1 | 10/2004 | Anerousis et al. |
| 2004/0210754 A1 | 10/2004 | Barron et al. |
| 2004/0240435 A1 | 12/2004 | Boucher et al. |
| 2004/0249881 A1 | 12/2004 | Jha et al. |
| 2004/0249998 A1 | 12/2004 | Rajagopalan et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0021874 A1 | 1/2005 | Georgiou et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0137964 A1 | 6/2005 | Nordlicht et al. |
| 2005/0172181 A1 | 8/2005 | Huliehel |
| 2005/0198531 A1 | 9/2005 | Kaniz et al. |
| 2005/0216597 A1 | 9/2005 | Shah et al. |
| 2005/0219278 A1 | 10/2005 | Hudson |
| 2005/0219314 A1 | 10/2005 | Donovan et al. |
| 2005/0231751 A1 | 10/2005 | Wu et al. |
| 2006/0026443 A1 | 2/2006 | McMahan et al. |
| 2006/0045098 A1 | 3/2006 | Krause |
| 2006/0067228 A1 | 3/2006 | Ronciak et al. |
| 2006/0067314 A1 | 3/2006 | Ho et al. |
| 2006/0075130 A1 | 4/2006 | Craft et al. |
| 2006/0126619 A1 | 6/2006 | Teisberg et al. |
| 2006/0165074 A1 | 7/2006 | Modi et al. |
| 2006/0187931 A1 | 8/2006 | Hwang |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0061439 A1 | 3/2007 | Pope et al. |
| 2007/0067497 A1 | 3/2007 | Craft et al. |
| 2007/0121596 A1 | 5/2007 | Kurapati et al. |
| 2007/0188351 A1 | 8/2007 | Brown et al. |
| 2007/0209069 A1 | 9/2007 | Saklikar et al. |
| 2007/0220183 A1 | 9/2007 | Kagan et al. |
| 2007/0223385 A1 | 9/2007 | Berly et al. |
| 2007/0237327 A1 | 10/2007 | Taylor et al. |
| 2007/0260602 A1 | 11/2007 | Taylor |
| 2007/0277036 A1 | 11/2007 | Chamberlain et al. |
| 2008/0005776 A1* | 1/2008 | VerSteeg ........... H04L 29/06027 725/139 |
| 2008/0008205 A1 | 1/2008 | Jung et al. |
| 2008/0024586 A1 | 1/2008 | Barron |
| 2008/0040519 A1 | 2/2008 | Starr et al. |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0140574 A1 | 6/2008 | Boucher et al. |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0189373 A1 | 8/2008 | Ikonen et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0024758 A1 | 1/2009 | Levy-Abegnoli et al. |
| 2009/0060197 A1 | 3/2009 | Taylor et al. |
| 2009/0165003 A1 | 6/2009 | Jacobson et al. |
| 2009/0182683 A1 | 7/2009 | Taylor et al. |
| 2009/0183057 A1 | 7/2009 | Aizman |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0287628 A1 | 11/2009 | Indeck et al. |
| 2009/0302923 A1 | 12/2009 | Smeloy et al. |
| 2009/0327323 A1 | 12/2009 | Altinel et al. |
| 2010/0012718 A1 | 1/2010 | Griswold et al. |
| 2010/0067488 A1 | 3/2010 | Sashihara |
| 2010/0088437 A1 | 4/2010 | Zahavi |
| 2010/0128623 A1 | 5/2010 | Dunn et al. |
| 2010/0138840 A1 | 6/2010 | Kagan et al. |
| 2010/0169880 A1 | 7/2010 | Haviv et al. |
| 2010/0185719 A1 | 7/2010 | Howard |
| 2010/0188140 A1 | 7/2010 | Smeloy |
| 2010/0189206 A1 | 7/2010 | Kagan |
| 2010/0198850 A1 | 8/2010 | Cytron et al. |
| 2010/0199085 A1 | 8/2010 | Bansal |
| 2010/0265849 A1 | 10/2010 | Harel |
| 2010/0274876 A1 | 10/2010 | Kagan et al. |
| 2010/0296518 A1 | 11/2010 | Cardona et al. |
| 2011/0004457 A1 | 1/2011 | Haviv et al. |
| 2011/0010557 A1 | 1/2011 | Kagan et al. |
| 2011/0019574 A1 | 1/2011 | Malomsoky et al. |
| 2011/0029669 A1 | 2/2011 | Chuang et al. |
| 2011/0029847 A1* | 2/2011 | Goldenberg ........ G06F 11/1004 714/801 |
| 2011/0040701 A1 | 2/2011 | Singla et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |
| 2011/0113083 A1 | 5/2011 | Shahar |
| 2011/0116512 A1 | 5/2011 | Crupnicoff et al. |
| 2011/0119673 A1* | 5/2011 | Bloch .................... G06F 9/546 718/102 |
| 2011/0151896 A1 | 6/2011 | Goldman et al. |
| 2011/0173352 A1 | 7/2011 | Sela et al. |
| 2011/0178917 A1 | 7/2011 | Parsons et al. |
| 2011/0178918 A1 | 7/2011 | Parsons et al. |
| 2011/0178919 A1 | 7/2011 | Parsons et al. |
| 2011/0178957 A1 | 7/2011 | Parsons et al. |
| 2011/0179315 A1 | 7/2011 | Yang |
| 2011/0184844 A1 | 7/2011 | Parsons et al. |
| 2012/0089496 A1 | 4/2012 | Taylor et al. |
| 2012/0089497 A1 | 4/2012 | Taylor et al. |
| 2012/0095893 A1 | 4/2012 | Taylor et al. |
| 2012/0102245 A1 | 4/2012 | Gole et al. |
| 2012/0108230 A1 | 5/2012 | Stepanian |
| 2012/0136514 A1 | 5/2012 | Noffsinger et al. |
| 2012/0151004 A1 | 6/2012 | Pope |
| 2012/0246052 A1 | 9/2012 | Taylor et al. |
| 2013/0007000 A1 | 1/2013 | Indeck et al. |
| 2013/0031268 A1 | 1/2013 | Pope et al. |
| 2013/0044604 A1* | 2/2013 | Hatley .................... H04L 43/10 370/241 |
| 2013/0080651 A1 | 3/2013 | Pope et al. |
| 2013/0145035 A1 | 6/2013 | Pope et al. |
| 2013/0312048 A1 | 11/2013 | Grossman |
| 2014/0105208 A1 | 4/2014 | Pope et al. |
| 2014/0279342 A1* | 9/2014 | Maynard ................ G06Q 40/04 705/37 |
| 2014/0310149 A1* | 10/2014 | Singh ..................... G06Q 40/04 705/37 |
| 2014/0310405 A1 | 10/2014 | Pope et al. |
| 2015/0049763 A1* | 2/2015 | Michels ............... H04L 12/6418 370/392 |
| 2015/0161064 A1 | 6/2015 | Pope |
| 2015/0169496 A1 | 6/2015 | Pope |
| 2016/0156749 A1 | 6/2016 | Pope et al. |
| 2016/0373561 A1 | 12/2016 | Pope et al. |
| 2017/0026497 A1 | 1/2017 | Pope et al. |
| 2017/0064051 A1 | 3/2017 | Steinmacher-Burow |
| 2018/0152546 A1 | 5/2018 | Pope et al. |
| 2019/0020740 A1 | 1/2019 | Pope et al. |
| 2019/0268450 A1 | 8/2019 | Pope et al. |
| 2019/0268451 A1 | 8/2019 | Pope et al. |

FOREIGN PATENT DOCUMENTS

| | | |
|---|---|---|
| WO | WO 00/10095 A1 | 2/2000 |
| WO | WO 2001/048972 A1 | 7/2001 |

(56) References Cited

FOREIGN PATENT DOCUMENTS

| WO | WO 2002/035838 A1 | 5/2002 |
|----|-------------------|--------|
| WO | WO 2008/127672 A2 | 10/2008 |
| WO | WO 2009/0134219 A1 | 11/2009 |
| WO | WO 2009/136933 A1 | 11/2009 |
| WO | WO 2010/020907 A2 | 2/2010 |
| WO | WO 2010/087826 A1 | 8/2010 |
| WO | WO 2011/043769 A1 | 4/2011 |
| WO | WO 2011/053305 A1 | 5/2011 |
| WO | WO 2011/053330 A1 | 5/2011 |

OTHER PUBLICATIONS

[No Author Listed], Declaration of Kevin Jeffay, Ph.D. Ex. 1001. Sep. 15, 2016. 66 pages.

[No Author Listed], Introduction to the tuxgraphics TCp/IP stack, 3$^{rd}$ generation. 2016. 27 pages.

[No Author Listed], Raw/TCP IwIP—lightweight TCP/IP. Wikia. 2016. 6 pages.

[No Author Listed], TUX web server. Wikipedia. https://en.wikipedia.org/wiki/TUX_web_server Last accessed Aug. 30, 2016. 2 pages.

Druschel et al., Lazy Receiver Procession (LRP): A Network Subsystem Architecture for Server Systems*.Proceedings of the 2$^{nd}$ USENIX Symposium on Operating Systems Design and Implementation (ODSI). 1996. 15 pages.

Druschel, Operating System Support for High-Speed Communication. Communication of the ACM. 1996;39(9):41-51.

Engler et al., Exokernel: An Operating System Architecture for Application-Level Resource Management. M.I.T. Laboratory for Computer Science Cambridge. 1995. 16 pages.

Engler et al., Exokernels (or, making the operating system just another application library). MIT Lab for Computer Science. PowerPoint. 1997 45 pages.

Engler, Structure and Architecture of MIT's Exokernel. 2000. 18 pages.

Granger et al., Fast and Flexible Application-Level Networking on Exokernel Systems. ACM Transactions on Computer Systems. 2002;20(1):49-83.

Johnson et al., The Peregrine High-Performance RPC System. Practice and Experience. Software-Practice and Experience. 1993;23(2):201-22.

Kaashoek et al., Application Performance and Flexibility on Exokernel Systems. M.I.T. Laboratory for Computer Science. PowerPoint. 1997. 23 pages.

Kaashoek et al., Application Performance and Flexibility on Exokernel Systems. Proceedings of the 16$^{th}$ Symposium on Operating Systems Principles (SOSP). 1997. 14 pages.

Kurose et al., Computer Networking. Pearson Educ., Inc., 3$^{rd}$edition. 2005. 51 pages.

Mansley, Engineering a User-Level TCP for the CLAN Network. Proceedings of the ACM SIGCOMM 2003 Workshops. 2003. 9 pages.

Maquelin et al., Polling Watchdog: Combining Polling and Interrupts for Efficient Message Handling. ISCA '23 Proceedings. vol. 24. No. 2 Computer Architecture News. 1996:179-88.

Perlman, Interconnections. Addison-Wesley. 2000;2:21 pages.

Riddoch et al., Distributed Computing with the CLAN Network. Proceedings of the 27$^{th}$Annual IEEE Conference on Local Computer Networks. 2002. 10 pages.

Tanenbaum, Computer Networks. Prentice Hall PTR 2003;4:19 pages.

EP 18157702.4, Jun. 18, 2018, Extended European Search Report.

Extended European Search Report for European Application No. 18157702.4 dated Jun. 18, 2018.

Extended European Search Report for European Application No. 18214201.8 dated May 17, 2019.

Jang et al., Implementation of a Hybrid TCP/IP Offload Engine Prototype. Advances in Computer Systems Architecture Lecture Notes in Computer Science. Springer. 2005;464-77.

EP 18214201.8, May 17, 2019, Extended European Search Report.

Extended European Search Report for European Application No. 12185546.4 dated Jul. 13, 2013.

Extended European Search Report for European Application No. 13153148.5 dated Feb. 19, 2014.

Extended European Search Report for European Application No. 13187725.0 dated Feb. 19, 2014.

A. Edwards, et al.; "User-Space Protocols Deliver High Performance to Applications on a Low-Cost Gb/s LAN," ACM Computer Communication Review, vol. 24, No. 4, pp. 14-23, Oct. 1994.

A. Romanow and S. Floyd; "The Dynamics of TCP Traffic over ATM Networks," ACM Computer Communication Review, vol. 24, No. 4, pp. 79-88, Oct. 1994.

Andrew D. Birrell, et al.; "Grapevine: An Exercise in Distributed Computing," Communications of the ACM, vol. 25, Issue 4, pp. 260-274, Apr. 1982.

Andy Currid; "TCP Offload to the Rescue," ACM Queue, vol. 2, No. 3, pp. 58-65, May 1, 2004.

B. Leslie, et al.; "User-level device drivers: Achieved performance," J. Comput. Sci. & Technol., vol. 20, pp. 1-17, Sep. 2005.

Babak Falsafi, et al.; "Application-Specific Protocols for User-Level Shared Memory," Proceedings of the 1994 conference on Supercomputing, pp. 380-389, Washington D.C.; Nov. 14, 1994.

Bilic Hrvoye, et al.; "Deferred Segmentation for Wire-Speed Transmission of Large TCP Frames over Standard GbE Networks," Proceedings of the 9th Symposium on High Performance Interconnects, 5 pages, Aug. 22, 2001.

Bilic Hrvoye, et al.; "Presentation given at HOTI'01," 9th Symposium on High Performance Interconnects, 9 pages, Aug. 22, 2001.

Bruce Lowekamp, et al.; "Topology Discovery for Large Ethernet Networks," ACM Computer Communication Review, vol. 31, No. 4, pp. 237-248, Oct. 2001.

Bruce S. Davie; "A Host-Network Interface Architecture for ATM," ACM Computer Communication Review, vol. 21, No. 4, pp. 307-315, Sep. 1991.

C. A. Thekkath, et al.; "Implementing Network Protocols at User Level," ACM Computer Communication Review, vol. 23, No. 4, pp. 64-132, Oct. 1993.

C. Brendan S. Traw, et al.; "A High-Performance Host Interface for ATM Networks," ACM Computer Communication Review, vol. 21, No. 4, pp. 317-325, Sep. 1991.

C. Kline; "Supercomputers on the Internet: A Case Study," ACM Computer Communication Review, vol. 17, No. 5, pp. 27-33, Aug. 1987.

C. Partridge, J. Hughes, J. Stone; "Performance of Checksums and CRCS over Real Data," ACM Computer Communication Review, vol. 25, No. 4, pp. 68-76, Oct. 1995.

C. Traw and J. Smith; "Hardware/Software organization of a high performance ATM host interface," IEEE Journal on Selected Areas in Communications, pp. 1-22, Feb. 1993.

Charles Kalmanek; "A Retrospective View of ATM," ACM Computer Communication Review, vol. 32, No. 5, pp. 13-19, Nov. 2002.

Charles P. Thacker and Lawrence C. Stewart; "Firefly: a Multiprocessor Workstation," ACM Operating Systems Review, vol. 21, Issue 4, pp. 164-172, Oct. 1987.

Cheng Jin, et al.; "FAST TCP: Motivation, Architecture, Algorithms, Performance," Proceedings of IEEE Infocom 2004, 21 pages, Mar. 7, 2004.

Chi-Chao Chang, et al.; "Low-Latency Communication on the IBM RISC System/6000 SP," Proceedings of the 1996 ACM/IEEE conference on Supercomputing, Pittsburgh, pp. 1-17, Nov. 17, 1996.

Chiou, Derek; Ang, Boon S., et al., "StarT-Voyager: A Flexible Platform for Exploring Scalable SMP Issues," Proc. 1998 ACM/IEEE conference on Supercomputing, Orlando, Florida, Nov. 7, 1998, 20pp.

Chris Maeda, Brian Bershad; "Protocol Service Decomposition for High-Performance Networking," ACM Operating Systems Review, vol. 27, Issue 5, 12 pages, Dec. 1993.

Christopher A. Kent, Jeffrey C. Mogul; "Fragmentation Considered Harmful," ACM Computer Communication Review, vol. 17, No. 5, pp. 75-87, Oct. 1987.

Craig Partridge; "How Slow is One Gigabit Per Second?," ACM Computer Communication Review, vol. 20, No. 1, pp. 44-53, Jan. 1990.

(56) References Cited

OTHER PUBLICATIONS

D. D. Clark and D. L. Tennenhouse; "Architectural Considerations for a New Generation of Protocols," ACM Computer Communication Review, vol. 20, No. 4, pp. 200-208, Sep. 1990.
D. L. Tennenhouse, D. J. Wetherall; "Towards an Active Network Architecture," ACM Computer Communication Review, vol. 26, No. 2, pp. 5-18, Apr. 1996.
Danny Cohen, et al.; "Use of message-based multicomputer components to construct gigabit networks," ACM Computer Communication Review, vol. 23, No. 4, p. 32-44, Jul. 1993.
Danny Cohen, Gregory Finn, Robert Felderman, Annette DeSchon; "Atomic: A Local Communication Network Created Through Repeated Application of Multicomputing Components," Provided by Authors, pp. 1-21, Jan. 10, 1992.
Danny Cohen, Gregory Finn, Robert Felderman, Annette DeSchon; "ATOMIC: A High-Speed Local Communication Architecture," Journal of High Speed Networks; pp. 1-11, Jan. 3, 1994.
David A Borman; "Implementing TCP/IP on a Cray computer," ACM Computer Communication Review, vol. 19, No. 2, pp. 11-15, Apr. 1989.
David D. Clark, et al.; "An Analysis of TCP Processing Overhead," IEEE Communications Magazine, vol. 27, No. 6, pp. 23-29, Jun. 1989.
David D. Clark; "The Design Philosophy of the DARPA Internet Protocols," ACM Computer Communication Review, vol. 18, No. 4, pp. 102-111, Aug. 1988.
David R Cheriton; "Sirpent: A High-Performance Internetworking Approach," ACM Computer Communication Review, vol. 19, No. 4, pp. 158-169, Sep. 1989.
David R. Boggs, et al.; "Measured Capacity of an Ethernet: Myths and Reality," ACM Computer Communication Review, vol. 18, No. 4, pp. 222-234, Aug. 1988.
David Wetherall; "10 Networking Papers: Readings for Protocol Design," ACM Computer Communication Review, vol. 36, No. 3, pp. 77-78, Jul. 2006.
Derek McAuley, Rolf Neugebauer; "A case for Virtual Channel Processors," Proceedings of the ACM SIGCOMM 2003 Workshops, pp. 237-242, Aug. 2003.
Derek Robert McAuley; "Protocol Design for High Speed Networks," PhD Thesis, University of Cambridge, 104 pages, Sep. 1989.
Dickman, L., "Protocol Offloading vs OnLoading in High Performance Networks," 14th Symposium on High Performance Interconnects, Aug. 23, 2006, 8pp.
E. Blanton and M. Allman; "On Making TCP More Robust to Packet Reordering," ACM Computer Communication Review, vol. 32, No. 1, pp. 20-30, Jan. 2002.
E. Ruetsche; "The Architecture of Gb/s Multimedia Protocol Adapter," ACM Computer Communication Review, vol. 23, No. 3, pp. 59-68, Jul. 1993.
Ed Anderson, et al.; "Performance of the CRAY T3E Multiprocessor," Proceedings of the 1997 ACM/IEEE conference on Supercomputing, pp. 1-17, San Jose, California; Nov. 16, 1997.
Edward D. Lazowska, David A Patterson; "Computing Research: A Looming Crisis," ACM Computer Communication Review, vol. 35, No. 2, 2005, pp. 65-68, Jul. 2005.
Edwards et al., Experiences implementing a high performance TCP in user-space. Proceedings of ACM SIGCOMM 1995, 1995. 10 pages.
Engler et al., "DPF: Fast, Flexible Message Demultiplexing using Dynamic Code Generation," 1996, M.I.T. Laboratory for Computer Science Cambridge, MA 02139, U.S.A., pp. 1-7.
Eric C. Cooper, et al.; "Protocol Implementation on the Nectar Communication Processor," ACM Computer Communication Review, vol. 20, No. 4, 10 pages, Sep. 1990.
Erich Ruetsche and Matthias Kaiserswerth; "TCP/IP on the Parallel Protocol Engine," Proceedings of the IFIP TC6/WG6.4 Fourth International Conference on High Performance Networking IV; pp. 119-134. Dec. 14, 1992.
F. F. Kuo; "The Aloha System," ACM Computer Communication Review, vol. 4, No. 1, pp. 5-8, Jan. 1974.
Ganger et al., "Fast and Flexible Application-Level Networking on Exokernel Systems," Feb. 2002, ACM Transactions on Computer Systems, vol. 20(1), pp. 49-83.
Gary S. Delp, et al.; "An Analysis of Memnet: An Experiment in High-Speed Shared-Memory Local Networking," ACM Computer Communication Review, vol. 18, No. 4, p. 165-174, Aug. 1988.
Gene Tsudik; "Message Authentication with One-Way Hash Functions," ACM Computer Communication Review, vol. 22, No. 5, pp. 29-38, Oct. 1992.
Geoffray, P., "Protocol off-loading vs on-loading in high-performance networks," 14th Symposium on High Performance Interconnects, Aug. 23, 2006, 5pp.
Gordon E. Moore; "Cramming more components onto integrated circuits," Electronics, vol. 38, No. 8, 4 pages, Apr. 1, 1965.
Greg Chesson; "The Evolution of XTP," Proceedings of the Third International Conference on High Speed Networking, pp. 1-10, Nov. 1991.
Greg Minshall, et al.; "Flow labelled IP over ATM: design and rationale," ACM Computer Communication Review, vol. 36, No. 3, pp. 79-92, Jul. 2006.
Greg Regnier, et al.; ETA: Experience with an Intel Xeon Processor as a Packet Processing EngineIEEE Micro, vol. 24, No. 1, pp. 24-31, Jan. 1994.
Greg Regnier, et al.; "TCP Onloading for Data Center Servers," Computer, IEEE Computer Society, vol. 37, No. 11, pp. 18-58, Nov. 2004.
Gregory G. Finn and Paul Mockapetris; "Netstation Architecture Multi-Gigabit Workstation Network Fabric," Proceedings of InterOp '94, Las Vegas, Nevada; pp. 1-9, May 1994.
Gregory G. Finn; "An Integration of Network Communication with Workstation Architecture," ACM Computer Communication Review, vol. 21, No. 5, 12 pages, Oct. 1991.
Gregory L. Chesson; "Declaration of Dr Gregory L Chesson in *Alacritech* v. *Microsoft*," United States District Court, Northern District California, San Francisco Division, 289 pages, Feb. 4, 2005.
H. K. Jerry Chu; "Zero-Copy TCP in Solaris," Proceedings of the USENIX Annual Technical Conference, 13 pages, Jan. 1996.
H. Kanakia and D. Cheriton; "The VMP Network Adapter Board (NAB): High-Performance Network Communication for Multiprocessors," ACM Computer Communication Review, vol. 18, No. 4, pp. 175-187, Aug. 1988.
Harvey J. Wassermann, et al.; "Performance Evaluation of the SGI Origin2000: A Memory-Centric Characterization of LANL ASCI Applications," Proceedings of the 1997 ACM/IEEE conference on Supercomputing, pp. 1-11, San Jose, California; Nov. 16, 1997.
Hodges, S. J. et al., "Remoting Peripherals using Memory-Mapped Networks," Olivetti and Oracle Research Laboratory, Cambridge Univ., 1998, 3 pp: <http:/www.cl.cam.ac.uk/research/dlg/www/publications/public/lil es/tr.98.6.pdf>.
Humaira Kamal, et al.; "SCTP versus TCP for MPI," Proceedings of the 2005 ACM/IEEE conference on Supercomputing, Seattle, Washington, 14 pages, Nov. 12, 2005.
Ian Leslie and Derek R McAuley; "Fairisle: An ATM Network for the Local Area," ACM Computer Communication Review, vol. 21, No. 4, pp. 327-336, Sep. 1991.
Ian M. Leslie, et al.; "The Architecture of the Universe Network," ACM Computer Communication Review, vol. 14, No. 2, pp. 2-9, Jun. 1984.
J. C. Mogul; "The Case for Persistent-Connection HTTP," ACM Computer Communication Review, vol. 25, No. 4, pp. 299-313, Oct. 1995.
J. Carver Hill; "Synchronizing Processors with Memory-Content-Generated Interrupts," Communications of the ACM, vol. 16, No. 6, p. 350-351, Jun. 1973.
J. Evans and T. Buller; "The End of History," IEEE TCGN Gigabil Networking Workshop, 10 pages, Apr. 22, 2001.
J. Vis; "A Simple LAN Performance Measure," ACM Computer Communication Review, vol. 24, No. 1, pp. 7-11, Jan. 1994.
Jack B. Dennis and Earl C. Van Horn; "Programming Semantics for Multiprogrammed Computations," Communications of the ACM, vol. 9, No. 3, pp. 143-155, Mar. 1966.

(56) References Cited

OTHER PUBLICATIONS

Jeffrey R. Michel; "The Design and Evaluation of an Off-Host Communications Protocol Architecture," MSci Thesis, University of Virginia, 144 pages, Aug. 1993.
Jenwei Hsieh, et al.; "Architectural and Performance Evaluation of GigaNet and Myrinet Interconnects on Clusters of Small-Scale SMP Servers," Proceedings of the 2000 ACM/IEEE conference on Supercomputing, Dallas, Texas, pp. 1-9, Nov. 4, 2000.
Jiuxing Liu, et al.; "Performance Comparison of MPI Implementations over InfiniBand, Myrinet and Quadrics," Proceedings of the 2003 ACM/IEEE conference on Supercomputing, Phoenix, Arizona, pp. 1-15, Nov. 15, 2003.
Joe Touch, et al.; "Experiences with a Production Gigabit LAN," Gigabit Networking Workshop '97 Meeting, Kobe, Japan, 10 pages, Apr. 1997.
Joe Touch, et al.; "Host-based Routing Using Peer DMA," Gigabit Networking Workshop '97 Meeting, Kobe, Japan, 2 pages, Apr. 1997.
John M. McQuillan, et al.; "An Overview of the New Routing Algorithm for the ARPANET," Proceedings of the 6th Data Communications Symposium, pp. 54-60, Nov. 1979.
John Nagle; "Congestion Control in IP/TCP Internetworks," ACM Computer Communication Review, vol. 14, No. 4, p. 11-17, Oct. 1984.
John Salmon, et al.; "Scaling of Beowulf-class Distributed Systems," Proceedings of the 1998 ACM/IEEE Conference on Supercomputing, Orlando, Florida, pp. 1-18, Nov. 7, 1998.
Jon Crowcroft, Derek McAuley; "ATM: A Retrospective on Systems Legacy," ACM Computer Communication Review, vol. 32, No. 5, pp. 11-21, Nov. 2002.
Jon Crowcroft; "10 Networking Papers: Recommended Reading," ACM Computer Communication Review, vol. 36, No. 2, pp. 31-32, Apr. 2006.
Jonathan Kay and Joseph Pasquale; "The Importance of Non-Data Touching Processing Overheads in TCP/IP," ACM Computer Communication Review, vol. 23, No. 4, 10 pages, Oct. 1993.
Jonathan M. Smith and C. Brendan S. Traw; "Giving Applications Access to Gb/s Networking," IEEE Network, vol. 7, issue 4, 14 pages, Jul. 1993.
Jonathan Smith; "The Influence of ATM on Operating Systems," ACM Computer Communication Review, vol. 32, No. 5, pp. 29-37, Nov. 2002.
Jonathan Stone, Craig Partridge; When the CRC and TCP Checksum Disagree, ACM Computer Communication Review, vol. 30, No. 4, 11 pages, Oct. 2000.
Jose Carlos Sancho, et al.; "Quantifying the Potential Benefit of Overlapping Communication and Computation in Large-Scale Scientific Applications," Proceedings of the 2006 ACM/IEEE conference on Supercomputing, Tampa, Florida, 40 pages, Nov. 11, 2006.
Justin Hurwitz, Wu-chun Feng; "Initial End-to-End Performance Evaluation of 10-Gigabit Ethernet," Proceedings of the 11th Symposium on High Performance Interconnects, 6 pages, Aug. 20, 2003.
K. Kleinpaste, P. Steenkiste, B. Zill; "Software Support for Outboard Buffering and Checksumming," ACM Computer Communication Review, vol. 25, No. 4, pp. 87-98, Oct. 1995.
Ken Calvert; "Reflections on Network Architecture: an Active Networking Perspective," ACM Computer Communication Review, vol. 36, No. 2, pp. 27-30, Apr. 2006.
Kieran Mansley, et al.; "Getting 10 Gb/s from Xen," Euro-Par Conference 2007, Rennes, France, 10 pages, Aug. 28, 2007.
L. S. Brakmo, et al.; "TCP Vegas: New Techniques for Congestion Detection and Avoidance," ACM Computer Communication Review, vol. 24, No. 4, pp. 24-35, Oct. 1994.
M. Allman; "TCP Byte Counting Refinements," ACM Computer Communication Review, vol. 29, No. 3, pp. 14-22, Jul. 1999.
M. de Vivo, et al.; "Internet Vulnerabilities Related to TCP/IP and T/TCP," ACM Computer Communication Review, vol. 29, No. 1, pp. 81-85, Jan. 1999.
M. Kaiserswerth; "The Parallel Protocol Engine," IEEE/ACM Transactions in Networking vol. 1, Issue 6, pp. 650-663, Dec. 1993.
M.V. Wilkes and R.M. Needham; "The Cambridge Model Distributed System," ACM SIGOPS Operating Systems Review, vol. 14, Issue 1, pp. 21-29, Jan. 1980.
Margaret L. Simmons and Harvey J. Wasserman; "Performance Comparison of the Cray-2 and Cray X-MP/416 Supercomputers," Proceedings of the 1988 ACM/IEEE conference on Supercomputing, pp. 288-295, Orlando, Florida; Nov. 12, 1988.
Mark David Hayter; "A Workstation Architecture to Support Multimedia," PhD Thesis, University of Cambridge, 111 pages, Sep. 1993.
Mark Hayter, Derek McAuley; "The Desk Area Network," ACM Operating Systems Review, vol. 25, Issue 4, pp. 1-11, Oct. 1991.
Marvin Zelkowitz; "Interrupt Driven Programming," Communications of the ACM, vol. 14, No. 6, p. 417-418, Jun. 1971.
Mengjou Lin, et al.; "Performance of High-Speed Network I/O Subsystems: Case Study of a Fibre Channel Network," Proceedings of the 1994 conference on Supercomputing, Washington D.C.; pp. 174-183, Nov. 14, 1994.
Michael J. Dixon; "System support for multi-service traffic," University of Cambridge Computer Laboratory Technical Report, No. 245, pp. 1-108, Jan. 1992.
Michael S. Warren, et al.; "Avalon: An Alpha/Linux Cluster Achieves 10 Gflops for $150k," Proceedings of the 1998 ACM/IEEE conference on Supercomputing, Orlando, Florida, pp. 1-10, Nov. 7, 1998.
Mogl, "TCP offload is a dumb idea whose time has come," USENIX Assoc., Proceedings of HotOS IX: The 9th Workshop on Hot Topics in Operating Systems, May 2003, pp. 24-30.
Montry G., OpenFabrics Alliance presentation slides, 14th Symposium on High Performance Interconnects, Aug. 23, 2006, 8pp.
Murali Rangarajan, et al.; "TCP Servers: Offloading TCP Processing in Internet Servers. Design, Implementation, and Performance," Technical Report DCR-TR-481, Computer Science Department, Rutgers University, 14 pages, Mar. 2002.
Nanette J. Boden, et al.; "Myrinet: A Gigabil-per-Second Local-Area Network," Draft of paper published in IEEE Micro, vol. 15, No. 1, pp. 1-15, Nov. 16, 1994.
NR Adiga, et al.; "An Overview of the BlueGene/L Supercomputer," Proceedings of the 2002 ACM/IEEE conference on Supercomputing, pp. 1-22, Baltimore; Nov. 16, 2002.
NVIDIA GPUDirect™ Technology-Accelerating GPU-based Systems, Mellanox Tech. Brief, May 2010, 2pp: <http://www.mellanox.com/pdf/whitepapers/TB_GPU_Direct.pdf>.
NVIDIA Tesla GPUs to Communicate Faster Over Mellanox InfiniBand Networks, press release dated Nov. 25, 2009, Portland OR, 3 pp: <http://gpgpu.org/2009/11/25/nvidia-tesla-mellanox-infiniband>.
O. Angin, et al.; "Report on the 5th IFIP Internation Workshop on Quality of Service (IWQOS 97)," ACM Computer Communication Review, vol. 27, No. 3, pp. 100-117, Jul. 1997.
P. Balaji, et al.; "Head-to-TOE Evaluation of High-Performance Sockets Over Protocol Offload Engines," Proceedings of the IEEE International Conference on Cluster Computing, 2005, pp. 1-10, Sep. 2005.
P. Druschel, et al.; "Experiences with a High-Speed Network Adaptor: A Software Perspective," ACM Computer Communication Review, vol. 24, No. 4, pp. 2-13, Oct. 1994.
P. Kermani and L. Kleinrock; Virtual cut-through: A new computer communciation switching technique, Computer Networks, vol. 3, No. 4, pp. 267-286, Sep. 1979.
Parry Husbands and James C. Hoe; "MPI-StarT: Delivering Network Performance to Numerical Applications," Proceedings of the 1998 ACM/IEEE conference on Supercomputing, Orlando, Florida, 15 pages, Nov. 7, 1998.
Pasi Sarolahti, et al.; "F-RTO: An Enhanced Recovery Algorithm for TCP Retransmission Timeouts," ACM Computer Communication Review, vol. 33, No. 2, pp. 51-63, Apr. 2003.
Patrick Crowley, et al.; "Characterizing Processor Architectures for Programmable Network Interfaces," Proceedings of the 14th international conference on Supercomputing, Santa Fe, New Mexico, 12 pages, May 8, 2000.
Patrick Geoffray; "A Critique of RDMA," HPCWire article: http://www.hpcwire.com/features/17886984.html, 7 pages, Aug. 18, 2006.

(56) References Cited

OTHER PUBLICATIONS

Paul E. McKenney and Ken F. Dove; "Efficient Demultiplexing of Incoming TCP Packets," ACM Computer Communication Review, vol. 22, No. 4, pp. 269-279, Oct. 1992.
Paul Ronald Barham; "Devices in a Multi-Service Operating System," PhD Thesis, University of Cambridge, 142 pages, Jul. 1996.
Paul V. Mockapetris, Kevin J. Dunlap; "Development of the Domain Name System," ACM Computer Communication Review, vol. 18, No. 4, pp. 112-122, Aug. 1988.
Peter Druschel and Larry L. Peterson; "Fbufs: A High-Bandwidth Cross-Domain Transfer Facility," ACM Operating Systems Review, vol. 27, Issue 5, pp. 189-202, Dec. 1993.
Peter Steenkiste; "Analyzing Communication Latency using the Nectar Communication Processor," ACM Computer Communication Review, vol. 22, No. 4, pp. 199-209, Oct. 1992.
Petrini, F., "Protocol Off-loading vs On-loading in High-Performance Networks," 14th Symposium on High Performance Interconnects, Aug. 23, 2006, 4pp.
Philip Buonadonna, et al.; "An Implementation and Analysis of the Virtual Interface Architecture," Proceedings of the 1998 ACM/IEEE conference on Supercomputing, Orlando, Florida, 20 pages, Nov. 7, 1998.
Piyush Shivam, et al.; "EMP: Zero-copy OS-bypass NIC-driven Gigabit Ethernet Message Passing," Proceedings of the 2001 ACM/IEEE conference on Supercomputing, Denver, CO, pp. 1-8, Nov. 10, 2001.
Pratt et al., Arsenic: A User-Accessible Gigabit Ethernet Interface. University of Cambridge, England. INFOCOM 2001. 11 pages.
R. Braden, et al.; "Computing the Internet Checksum," ACM Computer Communication Review, vol. 19, No. 2, p. 86-94, Apr. 1989.
R. Bush, D. Meyer; "Some Internet Architectural Guidelines and Philosophy," IETF Network Working Group, Request or Comments: 3439, pp. 1-25, Dec. 2002.
R. J. Black, I. Leslie, and D. McAuley; "Experiences of Building an ATM Switch for the Local Area," ACM Computer Communication Review, vol. 24, No. 4, pp. 158-167, Oct. 1994.
Raj K. Singh, et al.; "A Programmable HIPPI Interface for a Graphics Supercomputer," Proceedings of the 1993 ACM/IEEE conference on Supercomputing, pp. 124-132, Portland, Oregon; Nov. 15, 1993.
Raj K. Singh, et al.; "A Programmable Network Interface for a Message-Based Multicomputer," ACM Computer Communication Review, vol. 24, No. 3, pp. 8-17, Jul. 1994.
Regnier G., "Protocol Onload vs. Offload," 14th Symposium on High Performance Interconnects, Aug. 23, 2006, 1pp.
Robert M. Brandriff, et al.; "Development of a TCP/IP for the IBM/370," ACM Computer Communication Review, vol. 15, No. 4, pp. 2-8, Sep. 1985.
Robert M. Metcalfe and David R. Boggs; "Ethernet: distributed packet switching for local computer networks," Communications of the ACM, vol. 19, Issue 7, pp. 395-404, Jul. 1976.
Robert Ross, et al.; "A Case Study in Application I/O on Linux Clusters," Proceedings of the 2001 ACM/IEEE Conference on Supercomputing, Denver, CO, 17 pages, Nov. 10, 2001.
S. L. Pope, et al.; "Enhancing Distributed Systems with Low-Latency Networking," Parallel and Distributed Computing and Networks, Brisbane, Australia, pp. 1-12, Dec. 1998.
Sally Floyd; "TCP and Explicit Congestion Notification," ACM Computer Communication Review, vol. 24, No. 5, p. 8-23, Oct. 1994.
Sayantan Sur, et al.; "High-Performance and Scalable MPI over InfiniBand with Reduced Memory Usage: An In-Depth Performance Analysis," Proceedings of the 2006 ACM/IEEE conference on Supercomputing, Tampa, Florida, 13 pages, Nov. 11, 2006.
Srihari Makineni and Ravi Iyer; "Architectural Characterization of TCP/IP Packet Processing on the Pentium M Processor," Proceedings of the 10th International Symposium on High Performance Computer Architecture, 11 pages, Feb. 14, 2004.
Steve Muir and Jonathan Smith; "Piglet: A Low-Intrusion Vertical Operating System," Technical Report MS-CIS-00-04, University of Pennsylvania, 2000, pp. 1-15, Jan. 2000.
Steven J. Sistare, Christopher J. Jackson; "Ultra-High Performance Communication with MPI and the Sun Fire Link Interconnect," Proceedings of the 2002 ACM/IEEE conference on Supercomputing, p. 1-15, Baltimore; Nov. 16, 2002.
Steven Pope, David Riddoch; "10Gb/s Ethernet Performance and Retrospective," ACM Computer Communication Review, vol. 37, No. 2, pp. 89-92, Mar. 19, 2007.
Stuart Wray, et al.; "The Medusa Applications Environment," Proceedings of the International Conference on Multimedia Computing and Systems, Boston, MA, 9 pages, May 1994.
Sumitha Bhandarkar, et al.; "LTCP: Improving the Performance of TCP in Highspeed Networks," ACM Computer Communication Review, vol. 36, No. 1, pp. 41-50, Jan. 2006.
Thomas Sterling, et al.; "Beowulf: A Parallel Workstation for Scientific Computation," Proceedings of the 24th International Conference on Parallel Processing, pp. 1-4, Aug. 1995.
Thorsten von Eicken, et al.; "U-Net: A User-Level Network Interface for Parallel and Distributed Computing," ACM Operating Systems Review, vol. 29, Issue 5, pp. 40-53, Dec. 1995.
Tom Kelly; "Scalable TCP: Improving Performance in Highspeed Wide Area Networks," ACM Computer Communication Review, vol. 33, No. 2, pp. 83-91, Apr. 2003.
V. Cerf, et al.; "Proposal for an International End-to-End Protocol," ACM Computer Communication Review, vol. 6 No. 1, pp. 63-89, Jan. 1976.
V. Jacobson; "Congestion Avoidance and Control," ACM Computer Communication Review, vol. 18, No. 4, pp. 157-173, Aug. 1988.
Various forum members; "MPI: A Message-Passing Interface Standard," Message-Passing Interface Forum, University of Tennessee, Knoxville, 236 pages, May 5, 1994.
Vinay Aggarwal, et al.; "Workshop on network-I/O convergence: experience, lessons, implications (NICELI)," ACM Computer Communication Review, vol. 33, No. 5, pp. 75-80, Oct. 2003.
Vinton Cerf, Robert Kahn; "A Protocol for Packet Network Intercommunication," IEEE Transactions on Communications, vol. COM-22, No. 5, 13 pages, May 1974.
W. E. Leland, et al.; "On the Self-Similar Nature of Ethernet Traffic," ACM Computer Communication Review, vol. 23, No. 4, pp. 183-193, Oct. 1993.
W. Feng and P. Tinnakornsrisuphap; "The Failure of TCP in High-Performance Computational Grids," Proceedings of the 2000 ACM/IEEE conference on Supercomputing, Dallas, Texas, 11 pages, Nov. 4, 2000.
W. Feng, et al.; "Performance Characterization of a 10-Gigabit Ethernet TOE," Proceedings of the 13th Symposium on High Performance Interconnects, pp. 1-6, Aug. 17, 2005.
Wu-chun Feng, et al.; "Optimizing 10-Gigabit Ethernet for Networks of Workstations, Clusters, and Grids: A Case Study," Proceedings of the 2003 ACM/IEEE conference on Supercomputing, Phoenix, Arizona, 13 pages, Nov. 15, 2003.
EP 17167472.4, Jun. 30, 2017, Extended European Search Report.
EP 17172686.2, Sep. 20, 2017, Extended European Search Report.
Extended European Search Report for European Application No. 17167472.4 dated Jun. 30, 2017.
Extended European Search Report for European Application No. 17172686.2 dated Sep. 20, 2017.
Various; "Various presentations given at HOTI'06," 14th Symposium on High Performance Interconnects; Aug. 23, 2006.
U.S. Appl. No. 13/283,420, filed Oct. 27, 2011, Pope et al.
U.S. Appl. No. 15/016,659, filed Feb. 5, 2016, Pope et al.
U.S. Appl. No. 15/253,822, filed Aug. 31, 2016, Pope et al.
U.S. Appl. No. 15/879,909, filed Jan. 25, 2018, Pope et al.
U.S. Appl. No. 16/135,709, filed Sep. 19, 2018, Pope.
U.S. Appl. No. 16/413,413, filed May 15, 2019, Pope et al.
U.S. Appl. No. 16/413,445, filed May 15, 2019, Pope et al.
U.S. Appl. No. 13/754,792, filed Jan. 30, 2013, Pope et al.
EP 12185546.4, Jul. 13, 2013, Extended European Search Report.
EP 13153148.5, Feb. 19, 2014, Extended European Search Report.
EP 13187725.0, Feb. 19, 2014, Extended European Search Report.

(56) References Cited

OTHER PUBLICATIONS

U.S. Appl. No. 12/964,642—Office Action dated Feb. 12, 2014, 54 pages.
U.S. Appl. No. 12/964,642—Response to Feb. 12 Office Action filed Jul. 30, 2014, 16 pages.
U.S. Appl. No. 13/624,788—Office Action dated Aug. 1, 2014, 10 pages.
U.S. Appl. No. 13/624,788—Response to Aug. 1 Office Action filed Oct. 29, 2014, 14 pages.
U.S. Appl. No. 12/964,642—Notice of Allowance dated Nov. 26, 2014, 21 pages.
U.S. Appl. No. 13/283,420—Office Action dated Dec. 3, 2014, 66 pages.
U.S. Appl. No. 13/624,788—Notice of Allowance dated Dec. 5, 2014, 7 pages.
U.S. Appl. No. 13/283,420—Response to Dec. 3 Office Action filed Apr. 7, 2015, 13 pages.
U.S. Appl. No. 13/789,353—Office Action dated Apr. 23, 2015, 29 pages.
U.S. Appl. No. 13/789,353—Response to Apr. 23 Office Action filed Jul. 13, 2015, 17 pages.
U.S. Appl. No. 13/283,420—Office Action dated Jul. 22, 2015, 12 pages.
U.S. Appl. No. 13/789,353—Office Action dated Jul. 28, 2015, 31 pages.
U.S. Appl. No. 13/283,420—Response to Jul. 22 Office Action filed Sep. 14, 2015, 16 pages.
U.S. Appl. No. 13/789,353—Response to Jul. 18 Office Action filed Sep. 25, 2015, 13 pages.
U.S. Appl. No. 13/283,420—Notice of Allowance dated Oct. 2, 2015, 17 pages.
U.S. Appl. No. 13/789,353—Advisory Action dated Oct. 16, 2015, 4 pages.
U.S. Appl. No. 13/789,353—Response to Oct. 16 Advisory Action filed Oct. 27, 2015, 14 pages.
U.S. Appl. No. 13/754,792—Office Action dated Dec. 18, 2015, 33 pages.
U.S. Appl. No. 13/671,434—Office Action dated Mar. 23, 2016, 18 pages.
U.S. Appl. No. 14/231,510—Office Action dated Mar. 24, 2016, 16 pages.
U.S. Appl. No. 15/016,659—Notice of Allowance dated May 25, 2016, 20 pages.
U.S. Appl. No. 13/754,792—Response to Dec. 18 Office Action filed Jun. 16, 2016, 22 pages.
U.S. Appl. No. 13/789,353—Office Action dated Jul. 7, 2016, 29 pages.
U.S. Appl. No. 13/671,434—Response to Mar. 23 Office Action filed Jul. 8, 2016, 18 pages.
U.S. Appl. No. 14/231,510—Response to Mar. 24 Office Action filed Aug. 22, 2016, 14 pages.
U.S. Appl. No. 13/754,792—Office Action dated Sep. 23, 2016, 36 pages.
U.S. Appl. No. 13/789,353—Response to Jul. 7 Office Action filed Oct. 7, 2016, 17 pages.
U.S. Appl. No. 13/671,434—Notice of Allowance dated Nov. 7, 2016, 8 pages.

* cited by examiner

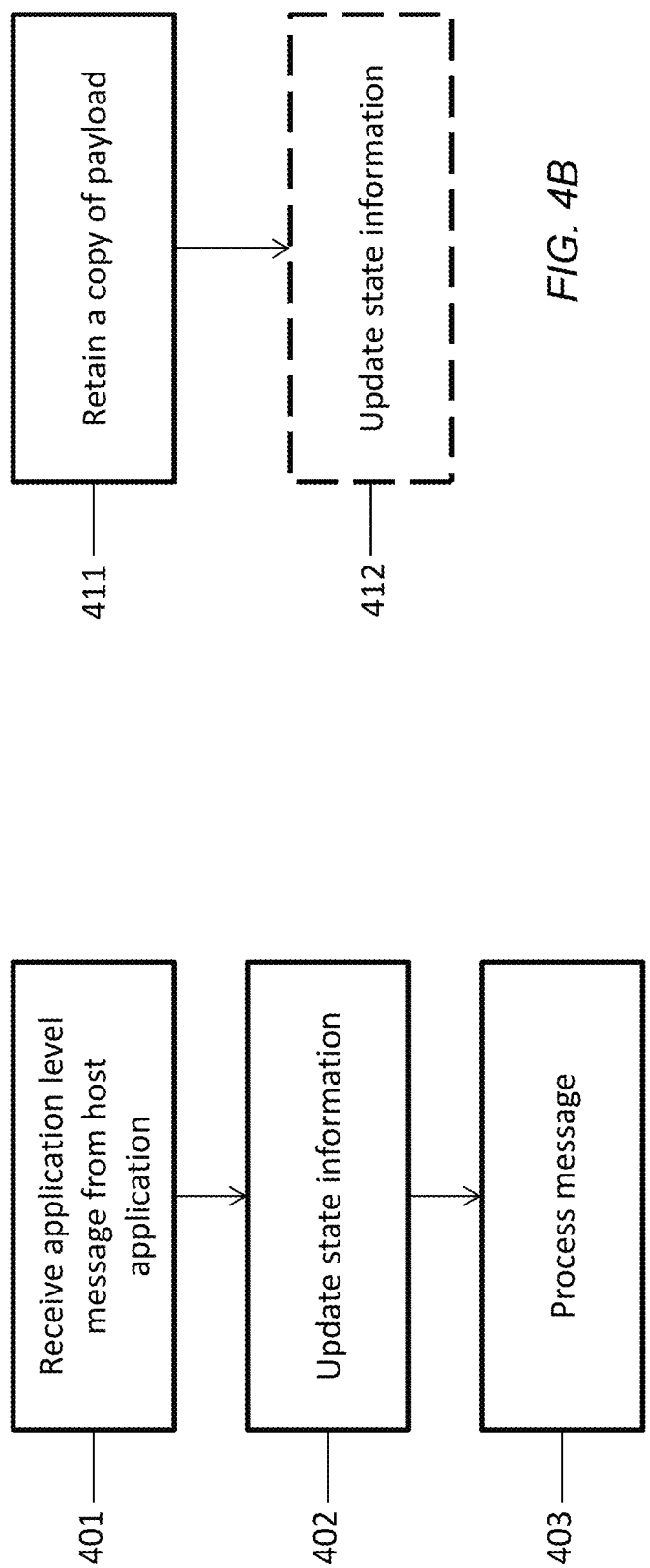

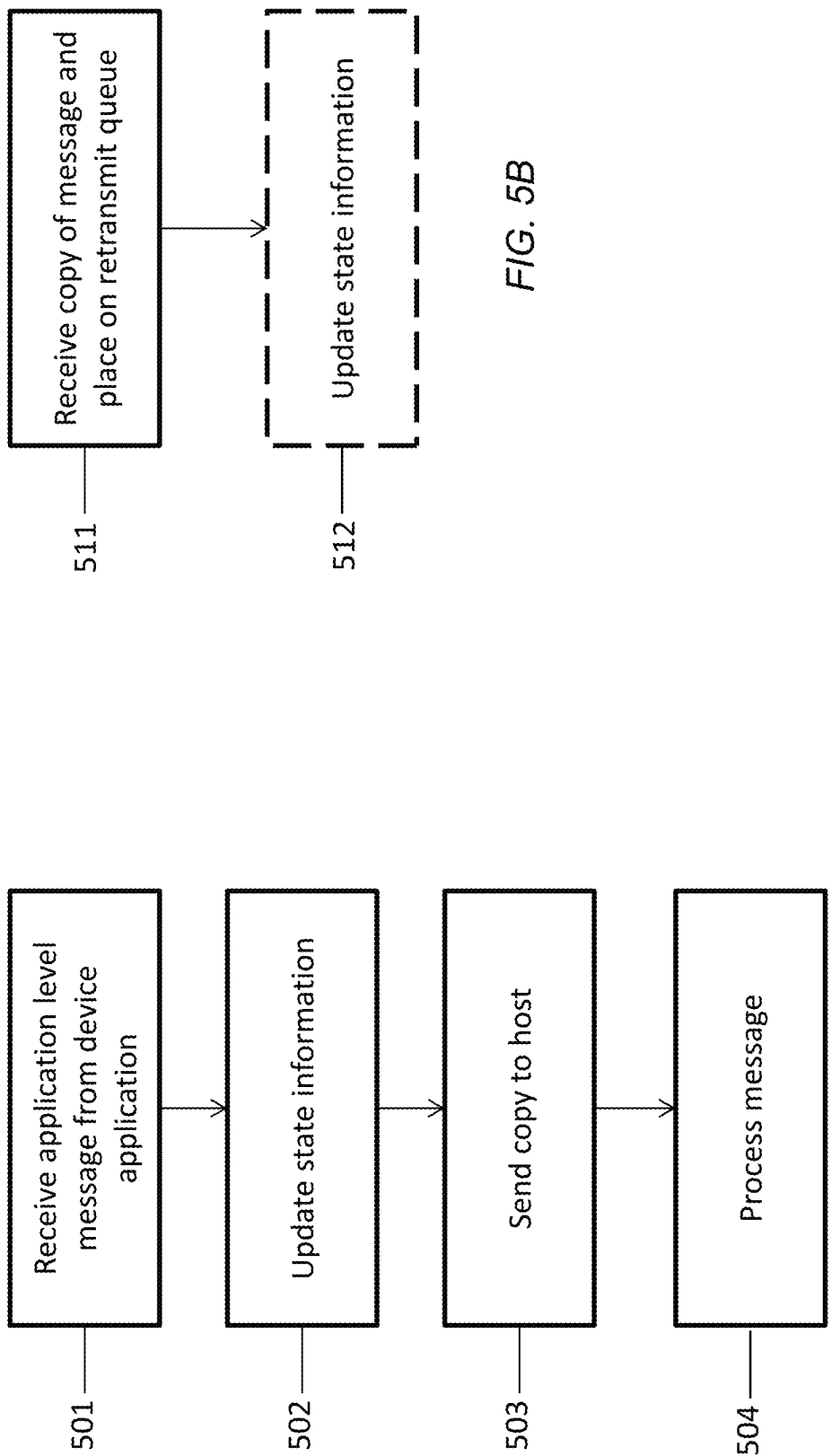

TCP PROCESSING FOR DEVICES

CROSS-REFERENCE TO RELATED APPLICATIONS

This application is a continuation of U.S. application Ser. No. 14/231,510, entitled "TCP PROCESSING FOR DEVICES," by Steven L. Pope and David J. Riddoch, filed Mar. 31, 2014.

Application Ser. No. 14/231,510 is a continuation-in-part of U.S. application Ser. No. 13/754,792, entitled "TCP PROCESSING FOR DEVICES," by Steven L. Pope and David J. Riddoch, filed 30 Jan. 2013.

Application Ser. No. 13/754,792 claims priority to provisional application U.S. Provisional Patent Application No. 61/714,405, entitled "FEED PROCESSING," by Steven L. Pope and David J. Riddoch, filed 16 Oct. 2012.

Application Ser. No. 13/754,792 is also a continuation-in-part of U.S. application Ser. No. 13/624,788, entitled "MESSAGE ACCELERATION," by Steven L. Pope and David J. Riddoch, filed 21 Sep. 2012, which application claims priority to U.S. Provisional Patent Application No. 61/538,055, entitled "MESSAGE ACCELERATION," by Steven L. Pope and David J. Riddoch, filed 22 Sep. 2011.

Application Ser. No. 13/754,792 is also a continuation-in-part of U.S. application Ser. No. 13/283,420, entitled "REDUCING NETWORK LATENCY," by Steven L. Pope, David J. Riddoch and Kieran Mansley, filed 27 Oct. 2011, which application claims priority to U.S. Provisional Patent Application No. 61/513,108, entitled "REDUCING NETWORK LATENCY," by Steven L. Pope, David J. Riddoch and Kieran Mansley, filed 29 Jul. 2011.

Application Ser. No. 13/754,792 is also a continuation-in-part of U.S. application Ser. No. 13/671,434, entitled "ENCAPSULATED ACCELERATOR," by Steven L. Pope, filed 7 Nov. 2012, which application claims priority to U.S. Provisional Patent Application No. 61/714,405, entitled "FEED PROCESSING," by Steven L. Pope and David J. Riddoch, filed 16 Oct. 2012 and is a continuation-in-part U.S. application Ser. No. 12/964,642, entitled "ENCAPSULATED ACCELERATOR," by Steven L. Pope, filed 9 Dec. 2010.

All the above applications are incorporated by reference herein.

BACKGROUND OF THE INVENTION

This invention relates to a data processing system comprising a host computing device and a network interface device together configured to perform transport stream processing.

In typical computer systems, streaming protocols such as TCP are generally handled in software at a network protocol stack supported at the computer system. This is because handling streaming protocols is expensive to implement in hardware (e.g. at a network interface device) in terms of both processing power and memory requirements. For example, data is transmitted over TCP by encapsulating it in TCP segments that could be dropped, retransmitted and reordered, and as a result a stream of data may not arrive at the receiver in the correct sequence. Thus, TCP streams require that the protocol stack managing the streams can handle out of order packets (which requires a significant amount of storage) and both the receive and transmit paths of a given stream (because the receive and transmit paths of a TCP stream are not independent). It follows that implementing TCP processing in hardware requires significant logic and a large amount of buffer memory to handle out-of-order packets and retain transmitted packets in case retransmission is required.

Nevertheless, due to the potential improvements in latency offered by processing TCP streams at a NIC, network interface devices that can perform TCP processing in hardware at a TCP offload engine (TOE) have been developed. Examples include NICs based on the Chelsio T4 and Broadcom BCM5708C chips. Performing protocol processing at the NIC also opens up the possibility of performing upper layer protocol processing at the NIC so as to further minimize the latency associated with communicating upper layer messages over TCP. This is because the transport layer TCP protocol must generally be processed prior to any upper layer protocols—for example, TCP data packets received at a NIC must be correctly reassembled into an ordered stream so as to allow the payload data of those data packets to be re-formed and the upper layer messages extracted for processing by the upper layer protocol stack. Thus, if TCP processing is performed at a NIC, the upper layer protocol processing can also be moved into hardware at the NIC, and the latency associated with upper layer messaging can potentially be reduced.

However, incorporating both a TCP offload engine and an upper layer protocol accelerator in hardware at a network interface device requires even greater processing power and memory to be present at the NIC. This significantly increases the complexity and cost of the network interface device, especially since bespoke hardware solutions such as FPGAs (field programmable gate arrays) are typically used to provide upper layer message processing specific to a particular application. Furthermore, the complexity of an integrated hardware TCP and upper layer protocol solution generally results in long development times and, since the hardware implementing the TCP offload engine and accelerator cannot generally be reconfigured with the same ease with which an updated software transport library can be installed into a host computer system, it is much more difficult to make changes to a hardware implementation (e.g. to fix bugs).

There is therefore a need for a host computer system and network interface device that can support low latency messaging over an upper layer protocol without requiring the complexity and expense of a TCP offload engine in hardware.

SUMMARY OF THE INVENTION

According to a first aspect of the present invention there is provided a data processing system comprising: a host processing device supporting a host transport engine operable to establish one or more transport streams over a network with a remote peer, the host transport engine maintaining state for each transport stream; and device hardware comprising: a device application; and a device transport engine operable to perform transport processing of a transport stream on behalf of the device application; wherein the host transport engine is configured to, on establishing a first transport stream for termination at the device application, pass sufficient state to the device transport engine so as to permit the device transport engine to perform transport processing of the first transport stream.

Suitably the device hardware is a network device adapted for connection to the network and operable to communicate data packets over the network. Suitably the network device is a network interface device configured to couple the host processing device to the network. Alternatively the network device is a distinct network entity to the host processing device on the network. Suitably the network device is a network switch.

Preferably the host transport engine is a software network protocol stack.

Preferably the device hardware includes a data store comprising information associating transport streams that are to be processed at the device transport engine with the device transport engine, and the device transport engine being configured to, on receiving a data packet from the network, perform a lookup into the data store in order to identify whether that data packet belongs to a transport stream associated with the device transport engine. Preferably the host transport engine is configured to, on passing state to the device transport engine for the first transport stream, cause the first transport stream to be associated with the device transport engine in the data store.

Preferably the device transport engine is configured to attempt to perform receive transport processing on any data packets received over transport streams associated with the device transport engine in the data store and to forward to the host transport engine any data packets that belong to transport streams that are not associated with the device transport engine in the data store.

Suitably the device application is configured to consume payload data received over the first transport stream and the state passed to the device transport engine permits the device transport engine to perform receive transport processing for the first transport stream. Preferably the state includes identifiers of the endpoints of the first transport stream and a sequence number parameter rcv_nxt of the next data packet the device transport engine can expect to receive over the first transport stream, the device transport engine being arranged to update the rcv_nxt parameter in response to data packets being received over the first transport stream. Suitably the first transport stream is a TCP/IP stream and the identifiers are local and remote IP addresses and TCP port numbers.

Preferably the device transport engine is configured to, on receiving a data packet over the first transport stream, forward the data packet to the host transport engine if the data packet is received out of sequence Preferably the receive transport processing performed by the device transport engine on a data packet being received over the first transport stream includes checking the integrity of the data packet by validating one or more checksums of the data packet. Suitably the checksums include one or more of IP, TCP and layer 2 checksums.

Preferably, on the one or more checksums of the data packet being successfully validated, the device transport engine continues receive transport processing by:

updating the rcv_nxt parameter of the first transport data stream;

forwarding the payload of the data packet to the device application; and forwarding a payload-received message to the host transport engine to indicate that the received data packet has been successfully processed, the payload-received message including at least the sequence number of the processed data packet.

Preferably the device transport engine is configured to: begin forwarding the payload of the data packet to the device application irrespective of whether validation of the one or more checksums of the data packet has completed; and on completion of validation of the one or more checksums, signal to the device application if checksum validation fails.

Preferably the device transport engine is configured to forward the payload of the data packet to the device application by streaming the payload to the device application as the payload of the data packet is received at the device transport engine.

Preferably the device transport engine is arranged to include with the payload forwarded to the device application an identifier of the first transport stream.

Preferably the payload-received message includes the headers of the received data packet but not its payload.

Preferably the host transport engine is configured to process the headers received in the payload-received message as though the payload were present so as to maintain current state for the first transport stream.

Preferably the device transport engine is configured to, on receiving a data packet over the first transport stream, forward the data packet to the host transport engine if the data packet is received out of sequence, and the host transport engine is configured to maintain a host reorder buffer at the host processing device for holding data packets received out of sequence at the device transport engine and forwarded to the host transport engine, the host transport engine being further configured to, on processing the payload-received message, forward to the device transport engine any data packets held in the host reorder buffer that have sequence numbers subsequent to the sequence number indicated in the payload-received message.

Preferably the host transport engine is configured to, on successfully processing the payload-received message, cause the device transport engine to transmit an acknowledgement packet to the remote peer of the first transport stream. Suitably the host transport engine is configured to at least in part generate the acknowledgement packet and pass the acknowledgement packet to the device transport engine over a connection established between the host and device transport engines, the device transport engine being arranged to in response transmit the acknowledgement packet over the first transport stream.

Suitably the device application is configured to generate payload data for the first transport stream and the state passed to the device transport engine permits the device transport engine to perform transmit transport processing for the first transport stream. Preferably the state includes identifiers of the endpoints of the first transport stream and a parameter snd_nxt indicating the sequence number of the next data packet to be transmitted by the device transport engine over the first transport stream, the device transport engine being arranged to update the snd_nxt parameter in response to data packets being transmitted over the first transport stream. Preferably the state includes state indicative of the maximum sequence number snd_max that the device transport engine is permitted to transmit over the first transport stream.

Suitably the state indicative of the maximum sequence number snd_max is the parameter snd_max or includes peer receive window and congestion window parameters for the first transport stream.

Preferably the device application is configured to, on generating payload data for the first transport stream, pass the payload data to the device transport engine, and the device transport engine being configured to in response: form a transport data packet comprising the payload data and transport protocol headers, the transport protocol headers including a transport checksum calculated over the payload data and one or more fields of the transport protocol headers; and cause the transport data packet to be transmitted over the first transport stream and forwarded to the host transport engine.

Preferably the device application is configured to calculate a checksum over the payload data and pass that checksum to the device transport engine with the payload data, and the device transport engine is configured to calculate the transport checksum from the checksum over the payload data passed to it by the device application and commence transmission of the transport data packet over the first transport stream irrespective of whether all of the payload data has been received.

Alternatively the device transport engine is configured to buffer payload data received from the device application until the end of an application message formed at the device application is reached or until enough payload is available for a transport packet of the maximum segment size, the device transport engine being configured to calculate the transport checksum from a checksum calculated over the buffered payload data.

Suitably the device hardware further comprises a layer 2 processing unit and the device transport engine commences transmission of the transport data packet by passing the transport data packet to the layer 2 processing unit.

Preferably the state includes state indicative of the maximum sequence number snd_max that the device transport engine is permitted to transmit over the first transport stream, and the device transport engine is configured to, on forming a transport data packet whose sequence number would exceed snd_max, cause that transport data packet to be transmitted to the host transport engine but not over the first transport stream, the host transport engine being responsible for causing that transport data packet to be transmitted over the first transport stream.

Preferably the host transport engine is configured to maintain a host retransmit buffer at the host processing device and to hold each transport data packet forwarded by the device transport engine in the host retransmit buffer until an acknowledgement packet is received for the transport data packet, the host transport engine being configured to retransmit the transport data packet as required by the transport protocol.

Preferably the device application is configured to pass the payload data to the device transport engine with an identifier of the first transport stream.

Suitably the host transport engine is configured to provide template transport protocol headers to the device transport engine and the device transport engine forms the transport data packet by completing the transport protocol headers and inserting the payload data.

Suitably the device transport engine is configured to provide an interface exposing transport state it maintains to the host transport engine, the transport state representing transmit flow control state and including information representative of one or more of peer receive window, congestion window, and a parameter snd_nxt indicating the sequence number of the next data packet to be transmitted by the device transport engine over the first transport stream.

Preferably the device transport engine and device application are configured to, on receiving a first data packet over the first transport stream for forwarding onto a second transport stream, perform forwarding of the first data packet by: the device transport engine being configured to perform receive path processing by: subtracting the contribution of the headers of the first data packet to the first transport checksum so as to form a modified checksum over only the payload of the first data packet; performing validation of the first transport checksum of the first data packet; and beginning forwarding the payload and the modified checksum to the device application irrespective of whether validation of the first transport checksum has completed; the device application being configured to pass the modified checksum with the payload of the first data packet to the device transport engine for processing on the transmit path; and the device transport engine being configured to perform transmit path processing by: forming transport protocol headers for a second data packet; and commencing transmission of the second data packet over the second transport stream irrespective of whether all of the payload data has been received from the device application, the transport protocol headers including a second transport checksum calculated from the modified checksum over the payload data.

Suitably the device hardware further comprises a MAC and the device transport engine commences transmission of the second data packet by passing the second data packet to the MAC.

Preferably the device application is configured to, if validation of the first transport checksum fails, pass through a signal indicating that validation of the first transport checksum has failed from the receive path of the device transport engine to the transmit path of the device transport engine so as to cause the device transport engine to abort transmission of the second data packet over the second transport stream.

Preferably the device transport engine is configured to, if transmission of the second data packet over the second transport stream has commenced, write a bad CRC onto the end of the second data packet.

Preferably the device application is configured to, on modifying the payload of the first data packet, update the first transport checksum over the payload of the first data packet and pass the modified payload to the device transport engine along with that updated checksum.

The device hardware could further comprise a packet re-order buffer arranged such that the device transport engine is operable to receive incoming data packets in sequence when those data packets are received out of sequence at the device hardware.

Preferably the device transport engine and device application are embodied at one or more reconfigurable logic devices.

According to a second aspect of the present invention there is provided a network device comprising: a physical layer signalling unit for connection to a network; a device application for terminating a first transport stream; and a device transport engine coupled to a network by the physical layer signalling unit and configured to perform transport processing of the first transport stream on behalf of the device application in response to receiving a message indicating that the device transport engine is permitted to perform processing of the first transport stream, the message comprising transport stream state sufficient to allow the device transport engine to perform transport processing of the first transport stream.

Preferably the device application and device transport engine are embodied at one or more reconfigurable logic devices. Suitably the reconfigurable logic device is an FPGA.

The network device preferably further comprises a layer 2 processing unit connected between the device transport engine and the physical layer signalling unit, the layer 2 processing unit being arranged to perform layer 2 processing of data packets communicated over the network.

Suitably the device application is arranged to consume payload data received over the first transport stream and the transport stream state received at the device transport engine permits the device transport engine to perform receive transport processing for the first transport stream.

Preferably the device transport engine is configured to perform validation of one or more checksums of a data packet received over the first transport stream and to: begin forwarding the payload of the data packet to the device application irrespective of whether validation of the one or more checksums of the data packet has completed; and on completion of validation of the one or more checksums, signal to the device application if checksum validation fails.

Preferably the device transport engine is configured to forward the payload of the data packet to the device application by streaming the payload to the device application as the payload of the data packet is received at the device transport engine.

Preferably the device transport engine is configured to, on completion of validation of the one or more checksums, forward a payload-received message to a predetermined network endpoint to indicate that the received data packet has been successfully processed, the payload-received message including the headers of the received data packet but not its payload.

Suitably the device application is arranged to generate payload data for the first transport stream and the transport stream state passed to the device transport engine permits the device transport engine to perform transmit transport processing for the first transport stream.

Preferably the transport stream state includes state indicative of the maximum data packet sequence number snd_max that the device transport engine is permitted to transmit over the first transport stream.

Preferably the device application is configured to, on generating payload data for the first transport stream, pass the payload data to the device transport engine, and the device transport engine being configured to in response: form a transport data packet comprising the payload data and transport protocol headers, the transport protocol headers including a transport checksum calculated over the payload data and one or more fields of the transport protocol headers; and cause the transport data packet to be transmitted over the first transport stream and forwarded to a predetermined network endpoint.

Preferably the device application is configured to calculate a checksum over the payload data and pass that checksum to the device transport engine with the payload data, and the device transport engine is configured to calculate the transport checksum from the checksum over the payload data passed to it by the device application and commence transmission of the transport data packet over the first transport stream irrespective of whether all of the payload data has been received.

Preferably the transport stream state includes state indicative of the maximum data packet sequence number snd_max that the device transport engine is permitted to transmit over the first transport stream, and the device transport engine is configured to, on forming a transport data packet whose sequence number would exceed snd_max, cause that transport data packet to be transmitted to the predetermined network endpoint but not over the first transport stream.

According to a third aspect of the present invention there is provided a method of performing transport protocol processing at a pair of transport engines comprising:

in software at a host transport engine:

establishing a transport stream over a network with a remote peer; forming state information for the transport stream; and passing sufficient state information for the transport stream to a device transport engine so as to permit the device transport engine to perform transport processing of the transport stream; and in hardware at the device transport engine: performing transport processing of the transport stream on behalf of a device application provided at the hardware.

According to a fourth aspect, there is provided a data processing system comprising:

a host processing device supporting a host transport engine operable to establish a first transport stream over a network with a remote peer; and device hardware comprising a device transport engine;

wherein the device transport engine is configured to monitor the first transport stream to determine a state of the first transport stream and in response to an indication from the host processing device perform transport processing of the first transport stream.

The device transport engine may be configured to monitor the transport stream by inspecting a header of a frame transmitted by the host transport engine corresponding to the first transport stream. The device transport engine may be configured to determine the state of the first transport stream in dependence on the contents of the header.

The device transport engine may be configured to perform processing on behalf of a host application. The device transport engine may be configured to perform processing on behalf of a device application. The host transport engine may be configured to perform processing on behalf of a host application. The host transport engine may be further configured to maintain state for the first transport stream. The device hardware may further comprise a device application.

The host transport engine may be configured to establish the first transport stream for termination at a device application. The host transport engine may be configured to establish the first transport stream for termination at a host application. The host transport engine may be further configured to pass additional state information to the device transport engine so as to permit the device transport engine to perform transport processing of the first transport stream in dependence on the determined state and the state passed from the host transport engine.

The device transport engine may be configured to monitor the transmit path of the data stream to determine the state information. The device transport engine may be further configured to monitor the receive path of the data stream to determine further state information. The indication may be a token.

According to a fifth aspect, there is provided a method comprising: monitoring a first transport stream established over a network with a remote peer by a host transport engine; determining a state of the first transport stream by a device transport engine; and performing transport processing of the first transport stream in response to an indication from the host processing device.

Monitoring the first transport stream may further comprise monitoring the transport stream by inspecting a header of a frame transmitted by the host transport engine corresponding to the first transport stream. The method may further comprise determining the state of the first transport stream in dependence on the contents of the header. The method may further comprise performing processing on behalf of a host application.

The method may further comprise performing processing on behalf of an device application. The method may further comprise monitoring the transmit path of the data stream to determine the state information. The method may further comprise monitoring the receive path of the data stream to determine further state information.

The method may further comprise establishing a first transport stream over a network with a remote peer by the host transport engine. The method may further comprise performing processing by the host transport engine on behalf of a host application. The method may further comprise the host transport engine maintaining state for the first transport stream. The method may further comprise the host transport engine establishing the first transport stream for termination at a device application. The method may further comprise the host transport engine establishing the first transport stream for termination at a host application.

The method may further comprise the host transport engine passing additional state information to the device transport engine so as to permit the device transport engine to perform transport processing of the first transport stream in dependence on the determined state and the state passed from the host transport engine.

DESCRIPTION OF THE DRAWINGS

The present invention will now be described by way of example with reference to the accompanying drawings, in which:

FIGS. 4a and 4b are flow diagrams showing a first example of an application level message being generated by the host application and the device application respectively; and FIGS. 5a and 5b are flow diagrams showing a second example of an application level message being generated by the host application and the device application respectively.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Broadly speaking, the present invention relates to a device transport engine configured to perform critical path transport protocol processing on behalf of one or more applications local to the transport engine and under the control of a full transport protocol stack supported at a host computing device.

A host computing device could be any kind of computing device, including: a server, a personal computer, a switch, a router, a bridge, and a portable device such as a tablet computer or smartphone. The host computing device supports a software environment such as an operating system that in turn supports one or more applications. The operating system could itself be part of a virtualized system comprising one or more guest operating systems supported by a privileged software domain, such as a hypervisor. A network interface device could be any hardware device configured to interface a wired or wireless network to a host computing device. The network interface device could be provided in any manner between a network and a host device, including: as one or more peripheral devices (such as a PCIe card) of a host computing device, and/or as an integral part of a host computing device (e.g. a LAN on mainboard, or LOM chipset).

Figure 1:
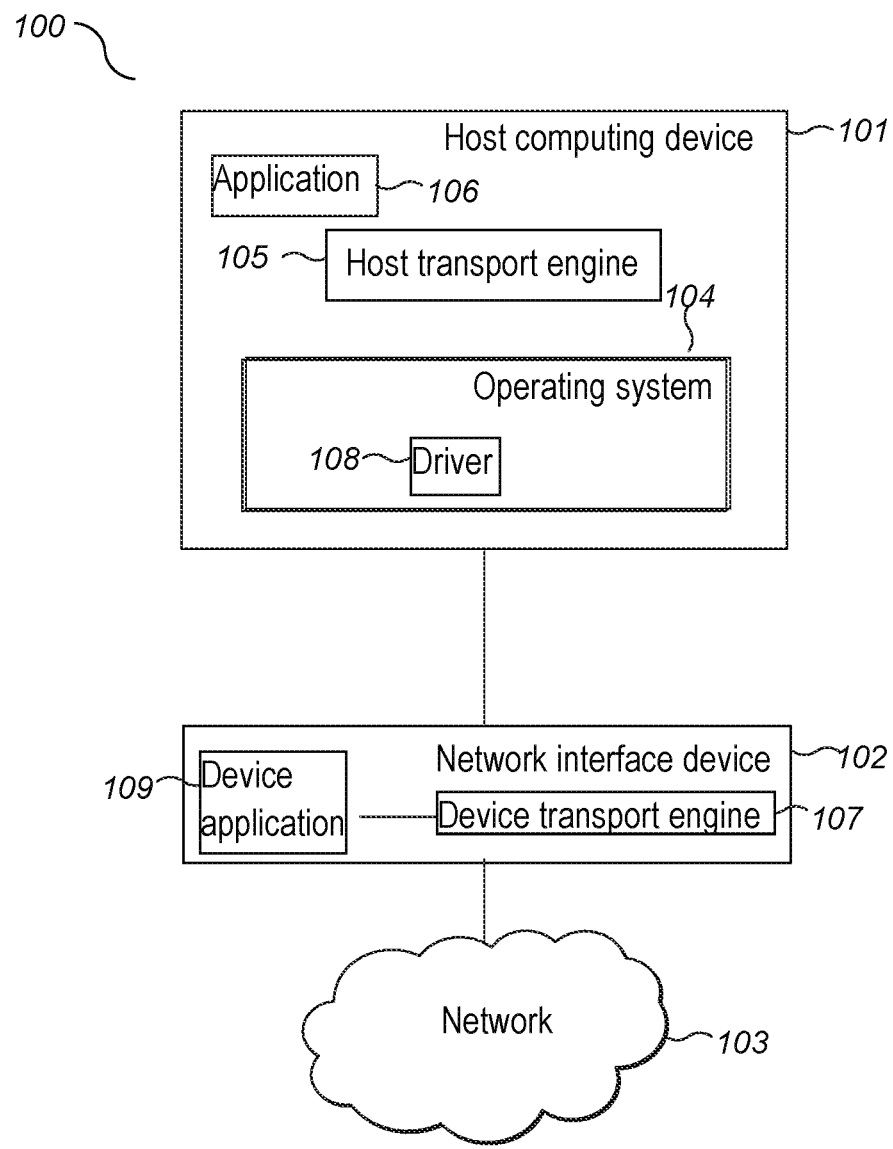
FIG. 1 is a schematic diagram of a data processing system configured in accordance with a first embodiment of the present invention.

A data processing system configured in accordance with a first embodiment of the present invention is shown in FIG. 1. The data processing system 100 comprises a host computing device 101 coupled to a network interface device 102 that is arranged to interface the host to network 103. The host computing device includes a host transport engine 105, which would typically be a software network protocol stack supported at an operating system 104. In FIG. 1 the host transport engine is a network stack at user level along with application 106, but alternatively the host transport engine could be provided at the operating system and operate in the kernel context. The operating system could be a conventional monolithic operating system, a privileged domain (e.g. a hypervisor) supporting one or more virtualized operating systems, or a virtualized operating system itself. There could therefore be multiple software environments at the host computing device.

The host transport engine is operable to process application layer messages so as to encapsulate each message in data packets in accordance with a transport stream protocol such as TCP. The host transport engine would typically also perform protocol processing according to one or more additional protocols. For example, if NIC 102 is an Ethernet NIC, the engine could be configured to form data packets in accordance with TCP, network layer internet protocol (IP) and link layer Ethernet (IEEE 802.3) so as to form data packets having a nested set of protocol headers as follows:

[Ethernet[IP TCP[<payload data>]]]

where transport layer TCP is carried within an IP packet which is carried within an Ethernet packet. It is well known in the art to perform link (e.g. Ethernet) and network layer (e.g. IP) protocol processing at either a host device or a NIC and this will not be discussed further. There may also be additional protocol layers above the transport layer—for example, quality of service protocol layers—and these can also be handled according to any suitable manner in the art, but would preferably be handled at the host device, such as at host transport engine 105 or at an application.

The host transport engine is shown in FIG. 1 as a single homogeneous unit but could in fact be a collection of multiple processing entities located in hardware (e.g. at a NIC or other peripheral device), and/or at the operating system (e.g. running in the kernel context), and/or at user level (e.g. at a user level transport library). The host transport engine could additionally be capable of handling data flows in accordance with any number of other connected-oriented or connectionless protocols.

As is conventional, application 106 at the host computing device can transmit data over network 103 by means of the host transport engine by passing messages to the host transport engine for transmission in accordance with the transport stream protocol. Typically those messages will be configured in accordance with an application layer protocol such as HTTP (e.g. in the case of data from a web server running at the host) or IMAP (e.g. in the case of data from an email server running at the host).

In the first embodiment of the present invention, a further transport engine is provided in the form of a device transport engine 107 that is coupled to the host transport engine and configured to receive and/or transmit data over transport streams on behalf of a device application 109. Device application 109 is configured to consume and/or produce application data communicated over transport streams and is located in hardware close to the device transport engine.

Device transport engine 107 is configured to transmit and/or receive application data of the device application over transport streams by performing limited transport stream processing in dependence on state passed to it from host transport engine 105. Unlike the host transport engine, the device transport engine is not configured to perform full transport layer protocol processing and control of the transport streams handled by the device transport engine remains with the host transport engine. For example, in the case in which the transport streams are TCP streams, the host transport engine maintains the TCP control block for a stream but can pass sufficient state information to the device transport engine to allow the device transport engine to perform limited transmission or reception of data over that TCP stream. The division of transport processing between the host and device transport engines is described in more detail below for packet transmission and reception. Device transport engine would typically be controlled by means of a driver 108 at the operating system of the host device (which could be the driver of the NIC).

Preferably device application 109 and device transport engine 107 are provided at network interface device 102 (as shown in FIG. 1), but alternatively one or both of the device application and device transport engine could be embodied (separately or together) in other hardware of the data processing system. For example, both the device application and device transport engine could be provided at an FPGA of the network interface device, or the device transport engine 107 could be an FPGA supported at the network interface device and the device application could be embodied in an FPGA supported at a peripheral device of the system.

Typically, device application 109 is configured to form or consume application layer messages in accordance with an upper layer protocol. The payload data of the messages could be generated at the device application, perhaps in response to receiving information from network 103 or host computing device 101. For example, device application 109 could be a trading algorithm embodied in an FPGA of NIC 102 and configured to receive one or more feeds from electronic financial exchanges over network 103. In response the trading algorithm could generate trades or normalized feed data from the received financial data for encapsulation in application layer FIX messages and transmitted over a transport data stream by means of device transport engine 107.

In the first embodiment of the present invention, the host transport engine and device transport engine are local to one another at data processing system 101.

Figure 2:
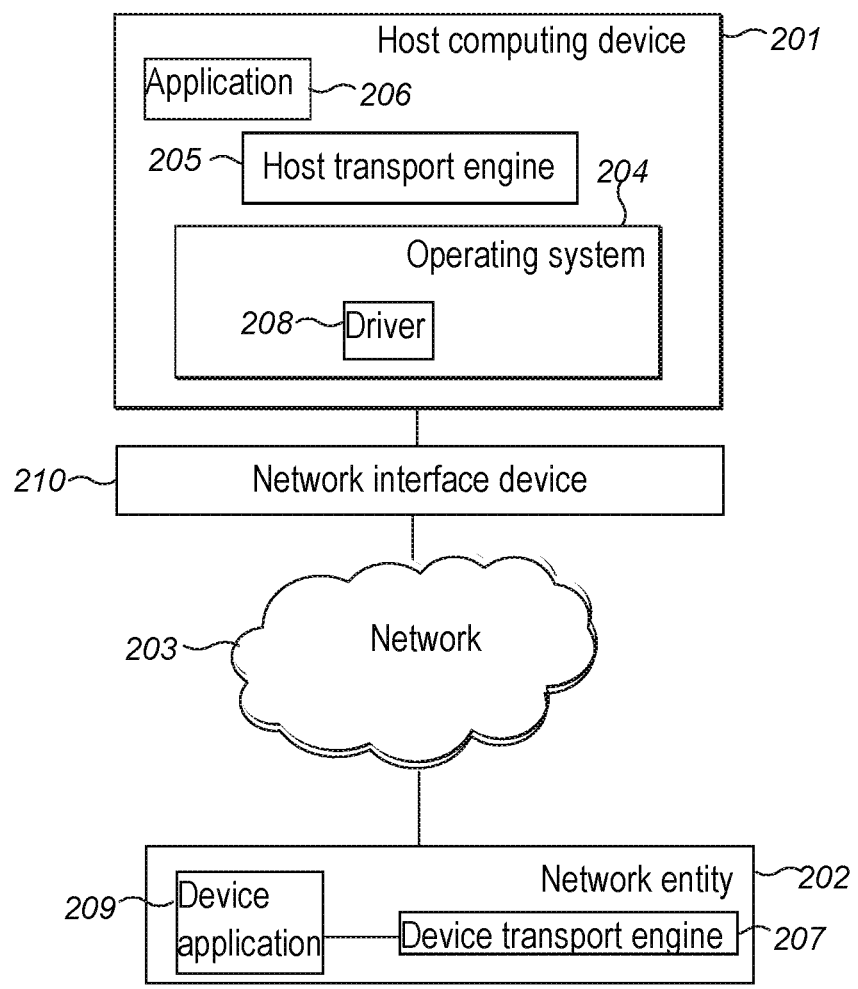
FIG. 2 is a schematic diagram of a data processing system configured in accordance with a second embodiment of the present invention.

A second embodiment of the present invention is shown in FIG. 2 in which device transport engine 207 is accessible to host transport engine 205 over a network 203. Host transport engine 205 is supported at a host computing device 201 that is coupled to network 203 by its local network interface device 210 (which could be a conventional NIC with no offload capabilities). NIC 210 allows the host transport engine to communicate data over network 203 and hence to network entity 202 which supports the device transport engine 207. As in the first embodiment, device transport engine 207 is permitted to communicate data over transport streams that are managed by host transport engine 205. The division of transport processing between the host and device transport engines is described in more detail below for packet transmission and reception.

Network entity 202 further includes device application 209 at which application layer data is formed or consumed and on behalf of which the device transport engine is configured to communicate data over the transport streams of the host transport engine. The network entity could be any kind of data processing device, such as a network interface device of another server, but it is particularly advantageous if the entity is a network switch or other packet control apparatus. This allows the host to permit the switch to perform critical path processing and locally handle communications over certain data streams. For example, the switch could be configured to process at its device application 209 data received on a first incoming transport stream controlled by the host device and push the processed data out over a second transport stream based on permissions received at device transport engine 207 of the switch from the host device. In most cases the data would not therefore traverse the host device, which is remote to the switch and which would typically comprise a relatively high-latency software host transport engine for performing transport protocol processing. The data streams could be financial data feeds with the switch being configured to perform normalization of the financial data at an FPGA device application. When the network entity is a switch, the switch can be readily configured to intercept packets that are addressed to the host. In other cases, the routing systems of the network would be configured so as to deliver data packets belonging to a transport stream that has been passed off to the network entity to that network entity.

By providing a device transport engine in hardware close to the network at which critical path transport processing can be performed, the split transport processing architecture described herein provides a low latency communication path for device applications that are configured to consume or generate data in hardware and which are not therefore close to a host transport engine such as a software network protocol stack. Furthermore, because the complexities of the transport protocol are handled at the host transport engine, the device transport engine can be relatively lightweight and straightforward to implement in a reconfigurable logic device such as an FPGA. The split transport processing architecture does not therefore suffer from the high cost of development and implementation suffered by, for example, full TCP offload engines (TOE) that are known in the art. In the case that the transport streams are TCP streams, connection management, packet re-transmission and packet re-ordering would preferably be performed at the host transport engine at which the required facilities for packet buffering are provided.

Since the payload data for the transport streams originates at and/or is consumed by device application 109 or 209, the device application can be considered to terminate the transport streams. Thus the transport streams can be managed remotely from the device(s) supporting both the application at which those streams can be considered to terminate and the device transport engine at which critical path transport processing is performed. This is to be contrasted with a TOE NIC device in which the application terminating a TCP stream is located in software on the host, with the NIC performing full TCP processing in hardware such that payload data must be passed between the host software and NIC.

Note that a device transport engine as taught herein could be configured to handle one or both of the transmit and receive path of a transport stream. For example, received data could be consumed in software at the host (e.g. at application 106 or 206) while transmitted data could be generated and sent by the device (e.g. generated at device application 109 or 209 and sent by device transport engine 107 or 207). This is possible because the host transport engine remains in control of the transport data streams over which data is transmitted or received. Certain applications might only require a device transport engine to handle the transmit or receive path in which case the device transport engine can be implemented with fewer resources, reducing development time and the complexity of the device.

The division of transport processing between the host and device transport engines in accordance with the split transport processing architecture will now be described in more detail with respect to the transmission and reception of data. In the following the host computing device 101/201 will be referred to as the "host", and the device at which the device(s) 102/202 transport engine and device application are supported will be referred to as the "device".

Once a connection has been established by the host transport engine, the host transport engine is configured to pass sufficient state to the device transport engine to allow the device transport engine to perform transmission and/or reception of data packets over a predetermined set of data streams. For a TCP/IP stream, the host transport engine might pass to the device transport engine the following state in order to migrate a TCP/IP stream to the device transport engine:

local and remote IP addresses, and TCP port numbers;
a VLAN identifier; and if the device is to handle the receive path:
sequence number of the next expected received transport packet; and if the device is to handle the transmit path:
a MAC address associated with the remote IP address;
sequence number of the next transport packet to be sent;
the maximum sequence number that the device transport engine is permitted to transmit.

Further state could include TCP stream options, such as maximum segment size.

The host transport engine could further indicate to the device transport engine both or one of the transmit and receive paths of a transport stream are to be handled at the device transport engine.

With regard to the receive path, the device transport engine is configured to use the transport stream state provided to it by the host transport engine to allow it to extract payload data from the data packets of one or more identified transport streams on behalf of a device application supported in local hardware. In the manner set out above, the state passed from the host transport engine indicates to the device transport engine the transport streams that are to be processed. For example, each received TCP/IP packet would typically include an identifier of the stream (e.g. local and remote IP addresses, TCP port numbers and possibly VLAN identifier) and a sequence number that identifies the position of the packet in the stream sequence. This information is held in the headers of a data packet and can be readily read from each data packet using simple logic.

When the host transport engine passes responsibility for receiving data packets to the device transport engine it sends to the device transport engine the sequence number of the first data packet that it is expected to handle. The device transport engine could then attempt to handle all data packets subsequently received over those streams until instructed otherwise by the host transport engine, or the host transport engine could instruct the device transport engine to handle, for example, data packets having sequence numbers within a predetermined receive window, a specified amount of payload data, or for a specified period of time.

On receiving a data packet belonging to the one or more identified transport streams, the device transport engine attempts to extract the transport payload and pass the extracted payload to the device application consumer. If the device transport engine successfully extracts the payload, it passes at least some header information (including the sequence number) of the data packet to the host transport engine in a packet-received message in order to inform the host transport engine that the data packet has been successfully processed at the device transport engine. In response the host transport engine updates the state it maintains for the transport stream. Preferably the packet-received message includes the headers of the received data packet (e.g. the full header block) to the host transport engine so as to allow the host to perform transport processing with minimal modification by arranging that the host transport device process the headers as though the payload data were present. Data packets received at the device transport engine that belong to transport streams that are not to be processed at the device transport engine are forwarded on to the host transport engine and processed at the host in the normal manner.

The device transport engine can be configured to establish whether a received data packet belongs to an identified transport stream by using identifiers from the packet header to perform a lookup into a data structure maintained at the network interface device identifying which transport streams are to be processed by the device transport engine.

The host transport engine is configured to perform negotiation of new connections and retains control over the transport streams that are to be processed at the device transport engine. The host transport engine is further arranged to perform any resource-intensive transport processing, such as packet re-ordering or retransmission which requires a transport engine to maintain a significant size of packet buffers. The device transport engine is configured to perform only critical path processing, which includes those steps required to extract payload data from transport packets received in sequence. Since, especially in latency critical scenarios packets are typically received in sequence, the device transport engine is enabled to perform transport processing of most received data packets belonging to an identified stream and hence allows transport processing to be performed with limited resources locally to the device application consumer.

In the event that the device transport engine cannot successfully process a received data packet, the data packet is forwarded to the host transport engine for transport processing. This would be the case, for example, if a data packet is received out of sequence, if the data packet is corrupted, or if any other error condition is raised at the device transport engine.

In order to keep transport processing of streams handled at the device as close to the device as possible, the host transport engine is preferably configured to, on receiving a payload-received message from the device that indicates a sequence range immediately prior to some of the buffered segments at the host, transmit the buffered segments back to the device transport engine. In other words: the device has received a missing segment and the out-of-order segments buffered at the host after being forwarded from the device can now be passed back to the device for processing in sequence.

The host transport engine sends ACKs in response to full data packets that it processes (e.g. forwarded packets including payload). The host transport engine is preferably further configured to cause the device to transmit ACKs in response to packets that are processed at the device. For example, the host transport engine could pass an ACK packet to the device for forwarding from the device on the host transport engine having successfully processed the payload-received message. Alternatively, the host transport engine could transmit a message to the device to cause the device transport engine to generate and transmit an ACK packet on the host transport engine having successfully processed the payload-received message. If the device transport engine is handling the transmit path of a stream in respect of which an ACK is to be sent, the device transport engine would as required (e.g. for TCP) write the sequence number of the next packet (snd_nxt as described below) into the sequence number field of the ACK packet header.

By way of example only, the following steps could be performed on receiving a data packet over a transport stream that is to be processed at the device transport engine:

1. If any of the following are true, forward the packet to the host transport engine:
    a. the packet is out of sequence;
    b. the packet does not have any payload;
    c. in the case of TCP packets, SYN or RST flags are set;
2. Validation of the packet checksums (e.g. TCP and IP checksums). If validation fails, the packet is discarded or forwarded to the host transport engine.
3. The remaining data packets are processed at the device transport engine by:
    a. updating the sequence number maintained at the device transport engine identifying the next expected sequence number;
    b. forwarding the transport payload to the device application consumer together with an indication of the transport stream to which the payload data relates;
    c. forwarding an indication to the host transport engine that the data packet has been successfully processed at the device transport engine—preferably the indication comprises the headers of the data packet.

Steps 1 and 2 would preferably be performed at a network interface device supported at the device transport engine, with the device transport engine being specifically configured to perform the transport processing of step 3. Typically the packet filtering logic of a NIC could be readily configured to perform step 1. The NIC would preferably also perform any packet lookup steps required to determine whether a packet is to be processed at the host or at the device transport engine.

Since the consumer of the application data is the device application in hardware local to the device transport engine, it is advantageous if the host transport engine is configured to handle out of order packets by performing packet re-ordering and, once the packets are available in the correct sequence, rather than performing transport processing at the host transport engine, re-transmitting the packets over the data stream such that the packets are correctly received in order at the device transport engine. Re-ordering the packets might involve the host transport engine requesting retransmission of any missing packets.

Typically the payload of the transport data packets would comprise upper layer protocol messages carrying the data for consumption at the device application, with the device application being arranged to perform upper layer protocol processing of the upper layer messages. For example, if the transport streams consumed at the device application are financial data feeds the upper layer messages could be FIX messages.

The host transport engine performs processing of packets forwarded to it in the normal manner Messages from the device transport engine that include at least some of the headers of data packets received and processed at the device transport engine are processed at the host transport engine as if the payload were present. This ensures that the state maintained at the host transport engine stays up to date.

As is known in the art, sufficient processing of the protocol layers below the transport layer (e.g. Ethernet and IP layers) is performed at the device transport engine to allow the engine to extract the transport payload without the data packets having to traverse a protocol stack at the host device. Typically the protocol processing of lower layers would include, for example, checking or calculating checksums, or performing encryption/decryption (e.g. in the case of IPSEC packets). Such steps could be performed at a network interface device at which the device transport engine is supported or at the device transport engine itself.

In the first embodiment of the invention in which the device transport engine 107 is local to the host 101, data may be communicated between the host and device transport engines over the data buses/interconnects of the data processing system at which the transport engines are provided. In the second embodiment of the invention in which the device transport engine 207 is remote from the host 201, data is communicated between the host and device transport engines over network 203 encapsulated within data packets formatted in accordance with the protocols in use over the network.

It is often a relatively frequent occurrence that packets are subject to minor re-ordering as they are carried over a network. It can therefore be advantageous to provide the device transport engine (or the device at which it is supported) with enough buffer space to perform re-ordering of a small number of data packets. This allows the device transport engine to handle minor packet re-ordering and avoids the potentially significant increase in latency due to the out-of-order packets being forwarded to the host transport engine. If the re-order buffer at the device becomes full or the device transport engine cannot successfully re-order the packet held in the buffer, then the packets are forwarded to the host as described above. The re-order buffer could be the maximum segment size of a transport stream (which for transport packets carried over Ethernet would typically be 1.5 kB). The re-order buffer would preferably be sufficiently large to hold several data packets of the maximum segment size (e.g. 2 or more and preferably 5 or more). This would require a buffer size of no more than a few kB.

The device application would typically be located in hardware close to the network so as to minimize the latency of communications to/from the application. It is therefore advantageous if steps are taken to minimize the latency associated with the transport processing performed by the device transport engine. One such improvement over conventional receive architecture is to configure the device transport engine to forward the transport payload irrespective of whether validation of the packet checksum(s) is complete (i.e. the payload could be forwarded before checksum validation completes). This receive cut-through reduces latency and requires less buffer space at the device transport engine or network device at which it is supported since transport packets intended for the device application can be streamed onto the device application without having to wait for the completion of checksum validation (which would typically only complete once at least the entire payload has been received).

The device transport engine is configured to signal to the device application consumer whether or not the packet checksum(s) have been successfully verified and the device application is arranged to discard the received payload data (including the results of any processing performed on that data) on receiving an indication that the checksum(s) of the respective transport packet are found to be incorrect. The device transport engine is preferably configured to signal to the device application only in the event that a checksum is found to be incorrect. In situations in which the importance of low latency outweighs the possibility of the device application processing bad data, it can be advantageous for the device application to be arranged not to discard the received payload data and to continue processing without interruption.

With regard to the transmit path, the device transport engine is configured to use the state provided to it by the host transport engine to encapsulate application data from the device application within transport data packets for transmission over the transport streams identified to it by the host transport engine. For example, in the case of a TCP/IP stream, the state would typically include as well as the identifiers of a data stream, at least a sequence number (snd_nxt) of the next packet to be sent by the device transport engine and a maximum sequence number (snd_max) that the device transport engine is permitted to transmit. Preferably the host transport engine is configured to send updated state to the device transport engine when the maximum sequence number snd_max changes so as to allow the device transport engine to continue to transmit over the data stream. The host transport device can be configured to calculate the state for the device in the usual manner from the receive and congestion window parameters:

snd_max=snd_nxt+min(peer_receive_window, congestion_window)

The device transport engine maintains state at least defining the next sequence number to be transmitted by the device over each stream. This value is increased each time a data packet is sent over the respective transport stream.

By way of example only, the following steps could be performed on the transmit path when the device application has data to transmit over a transport stream by means of the device transport engine:

1. The device application generates transport payload and passes it to the device transport engine along with an indication of the stream over which it is to be transmitted.
2. The device transport engine buffers the payload until the end of the application message or until sufficient payload is available for a data packet of the maximum segment size. This requires minimal buffer resources at the device. A checksum is calculated over the payload, preferably as the payload streams into the buffer.
3. The transport protocol headers are formed/completed for the data packet. This includes writing into the headers the sequence number of the data packet from the state held at the device defining the sequence number of the next packet to be transmitted, along with the transport checksum.
4. The transport packet is completed by forming the headers of the lower protocol layers. This step could be performed by the device transport engine but would preferably be performed at a network interface device supporting the device transport engine, typically by streaming the packet out to the MAC of the network interface device.
5. A copy of the data packet is forwarded to the host transport engine for storing in a buffer (e.g. a retransmit queue).

This last step ensures that the host transport engine retains a copy of the data packet until it is acknowledged by the remote endpoint of the stream to which the packet is sent. If the transport protocol requires retransmission of the data packet, the host transport engine then has a copy of the data packet to send out. The device transport engine is configured to ignore retransmission requests received over the data stream since these are handled at the host.

It can be advantageous to omit step 2 above in the case that the device application is arranged to supply the payload data checksum to the device transport engine along with the payload for the transport packet. For many applications, the payload data will consist of an application message having a known format for which many of the fields are known prior to the device application performing significant processing. It can therefore be advantageous if the device application is configured to partially calculate the transport checksum over the parts of the payload that are initially known. Once the device application has performed its processing and fully formed its message for transmission, the device application then updates the checksum according to the newly-completed parts of the message. By performing checksum processing in this manner the device transport engine need not buffer the message prior to its transmission in order to calculate the transport checksum over the payload data. The resources required at the device transport engine are therefore reduced and transport packets can be sent out at lower latency since there is no need to halt the transmission of a packet in order to calculate the transport checksum.

The above transmit cut-through arrangement is particularly useful in situations in which the device application is required to form only one or two values for an application message. For example, the device application could be a financial trading engine configured to place trades on a security. The device application could therefore have prepared one or more message templates that contain much of the information required to place a trade at a remote exchange (such as identifiers of the trading engine and the security, and the structure of the message). On the device application then receiving information indicating that a trade should be placed, the device application would calculate values for (e.g.) the volume and price for the trade which would be inserted into the message template prior to passing the message to the device transport engine.

Preferably the device application is configured to supply payload data/application messages that do not exceed the maximum transmit segment size of the data stream.

It can be advantageous if the host transport engine is configured to pass template data packets to the device transport engine into which the upper layer message payload can be inserted. The device transport engine completes the templates in dependence on the payload data passed to it by the device application and the protocol state held at the device. The host transport engine would preferably be configured to transmit a single template packet when the host passes the state required for a stream to the device. Alternatively, the host could pass a template for each data packet to be transmitted by the device transport engine. The packet template would preferably include the information necessary to form lower layer protocol headers, such as (for a TCP/IP/Ethernet data packet) Ethernet MAC address, VLAN-ids, IP addresses and IP IDs. If a template as such is not passed to the device transport engine, the information required for a data packet will be available to the device in the state passed to it by the host transport engine.

State relating to transmit flow control is preferably maintained by the host transport engine that manages the data stream in dependence on the remote endpoint's TCP receive window (i.e. whether the endpoint can receive data packets over the stream) and enforcement of congestion control algorithms. This avoids unnecessary complexity at the device which need only understand the maximum permitted sequence number passed to it by the host. Alternatively the device transport engine could be configured to perform basic transmit flow control and maintain parameters identifying, in the case of a TCP stream for example, the TCP receive window, congestion window, and an indication of the number of data packets the device transport engine is authorised to transmit (i.e. maximum sequence number—next sequence number). Analogous parameters exist for other transport protocols. Preferably the device transport engine is arranged to provide an interface that exposes this state information to the host transport engine so as to allow the host to maintain visibility over all state relating to the transport streams it is managing.

It is advantageous if in the event the device application passes payload data to the device transport engine which, if transmitted over the data stream, would cause the device transport engine to exceed the maximum permitted sequence number, the device transport engine is configured to form those transport packets but forward those packets to the host transport engine rather than over the data stream to the intended remote endpoint. The host transport engine can then transmit the data packet as and when the remote receive window and/or congestion window opens sufficiently.

As is known in the art, the device transport engine or preferably the network device (e.g. at a MAC or other layer 2 processing unit of a NIC) at which it is supported is further configured to perform processing of protocol layers below the transport layer so as to allow the device transport engine to transmit data packets without the application data being required to traverse the host.

The device application and device transport engine could be configured to combine the cut-through receive and transmit paths described above so as to provide a low-latency cut-through for upper layer messages that are for forwarding between transport streams. In order to achieve forwarding cut-through, the device transport engine is configured to, on receiving a data packet for forwarding, update the transport checksum of the packet so as to subtract the contribution from the header, leaving a checksum over just the payload of the data packet. This can be performed at low latency since the headers of the data packet which carry the transport checksum are received first. The payload checksum is then passed along with the payload directly to the transmit path of the device transport engine in accordance with the transmit cut-through arrangement. The received data packet can therefore be streamed directly onto the transmit path without the data packet being required to be held at a buffer whilst its checksum is verified. Note that it need not be known when the packet starts to be streamed on to the transmit path whether the checksum is correct.

In accordance with the receive cut-through arrangement, the device transport engine completes validation of the transport checksum once the entire payload has been received. If validation of the checksum fails then the device transport engine signals to the transmit path to abort the transmit operation—this can be achieved by the device application passing the signal indicating that checksum validation has failed from the receive path to the transmit path logic of the device transport engine; alternatively, the receive path logic of the device transport engine could be configured to signal directly to the transmit path logic of the device transport engine. If the packet has already been partially written onto the wire then the packet is poisoned by writing a bad CRC onto the end of the data packet.

The receive path of the device transport engine passes a payload-received message to the host transport engine in the manner described above in relation to the reception of data packets, and the transmit path of the device transport engine forwards a copy of the forwarded data packet to the host transport engine in the manner described above in relation to the transmit of data packets.

Since the receive path of the device transport engine is directed to the device application and the transmit path of the device transport engine originates at the device application, it would typically be straightforward to arrange that data packets for forwarding are streamed via the device application. This allows the device application to perform packet inspection and/or validation functions while adding minimal latency. If the device application modifies the payload it updates the payload checksum so as to reflect the changes so that the transmit path receives the correct checksum with the payload for forwarding.

A device transport engine 107/207 of the present invention could be provided as a field programmable gate array (FPGA) at or connected to a network device such as a network interface device 102 or a switch 202. Such an FPGA would preferably be located between the network and the controller logic of the network interface device and switch such that packets received from the network first pass through the FPGA. This allows the FPGA to intercept any data packets for which it is to perform transport processing.

The host transport engine is responsible for maintaining most of the state associated with each stream, with any state held at the device transport engine (e.g. the sequence number of the next packet for transmission or reception over a transport stream handled at the device) being passed to the host transport engine so as to ensure the host remains in control of all of the transport streams handled at the device. The host transport engine can pull back transport streams being handled at the device through appropriate signalling to the device transport engine.

The device and host transport engines are configured so as to allow the host transport engine to generally perform transport processing in the normal manner Thus:

packets forwarded to the host transport engine by the device transport engine are processed as normal;

the device transport engine is configured to send a payload-received message to the host transport engine on successfully performing transport processing on a received data packet, the message includes sufficient header information from the received data packet so as to allow the host to process packet headers as though the payload were present (preferably the headers of the received data packet are simply forwarded to the host transport engine in the message and the host discards the message once processed);

in dependence on the state it holds for the transport streams, the host transport engine calculates the snd_max parameter for each transport stream handled at the device, snd_max indicating the highest sequence number the device is permitted to transmit over the respective stream.

The host transport engine further maintains the usual support structures, such as timers for supporting, for example, delayed acknowledgements, retransmit timeout, zero-window probes, keep-alive probes. If the MAC address associated with the remote endpoint of a stream changes, the host transport engine updates the remote MAC stored at the device for that stream (which would have been passed to the device when stream processing was passed to the device from the host). Preferably a single predetermined message type is used to convey messages between the host and device transport engines. These messages (e.g. ACK templates and messages carrying control or transport stream state information) would typically be carried on a data stream established between the host and device: if the host and device are remote to one another this would be a network stream; if the host and device are coupled to one another by means of a bus or interconnect, the messages would be communicated according to the bus/interconnect architecture.

By way of example, in the case of TCP the host transmit engine would handle data packets in much the normal way:
- packets that acknowledge new data (ACKs) would typically cause packets stored in the retransmit queue to be freed;
- packets that acknowledge new data (ACKs) would typically cause the congestion window of a stream to be increased;
- duplicate acknowledgements (ACKs) would typically cause packets stored in the retransmit queue to be retransmitted according to the "fast retransmit" algorithm;
- packets with payload that fails a sequence check could be buffered (if out-of-order but in-window) or discarded (if out-of-window);
- packets that update the remote peer's receive window cause that update to be reflected in the TCP state;
- packets with the RST flag set may cause the TCP connection to be aborted;
- packets may cause timers to be started, modified or stopped.

A first exemplary implementation of the split transport processing architecture shown in the figures will now be described. Host computing device 101/201 supports a financial application 106/206 configured to interact with a remote electronic exchange that is arranged to provide one or more TCP streams carrying financial data feeds. The host computing device 101/201 communicates over network 103/203 by means of host transport engine 105/205 and network interface device 102/210. Financial application is configured to manage related device application 109/209 which is embodied on an FPGA at network device 102/202.

Financial application 106 is arranged to select a trading strategy for execution at the device application in dependence on the financial data feeds received over the TCP streams. The application configures related device application 109/209 to place trades at the electronic exchange over the one or more TCP streams under the control of a set of trading algorithms configured to effect the selected trading strategy. Device application 109/209 is therefore a consumer of the financial data feeds to which in response it generates trading messages.

In order for the transport processing of packets carrying data for consumption at or generated by the device application to be performed close to the device application, the device is provided with a device transport engine 107/207 that is configured to perform critical path TCP processing under the control of host transport engine 105/205. The host transport engine passes the transport streams over which the financial data is received and the transport streams over which trades are to be transmitted to the device transport engine in accordance with the mechanisms described herein. Thus, the device transport engine performs receive processing on the data streams carrying the financial data feeds so as to extract the payload financial messages for the device application, and it performs transmit processing on the trading messages generated at the device application in order to form transport data packets for transmission over the data streams terminating at a remote financial exchange.

In this example, device transport engine 107/207 is embodied at an FPGA, which could be the same FPGA at which the device application is supported. This allows the trades performed by the device application to be generated at very low latency in response to the incoming financial data feeds. The device application consuming the financial feeds could be separate to the device application generating the trades, the two device applications both being embodied at an FPGA of the device and in communication with one other or by means of a common memory.

When the device transport engine is provided at a network interface card 102 of the host processing device 101 as shown in FIG. 1, the device transport engine is preferably located between the controller of the NIC (not shown) and the network 103 such that network traffic received at the host first passes through the device transport engine (which could, for example, be an FPGA having one or more MACs for interfacing with the NIC controller and a PHY of the NIC connected directly to the network). This arrangement allows the device transport engine to intercept data packets received over transport streams handed off to the device transport engine. Similarly, in relation to FIG. 2, when the device transport engine is provided at a switch, the device transport engine is preferably located between the switch controller and network such that network traffic received at the switch first passes through the device transport engine. Again, this arrangement allows the device transport engine to intercept data packets received over transport streams handed off to the device transport engine without requiring the routing of data packets on the network to be updated in order to direct to the device transport engine transport streams handed off to the device transport engine.

In a further aspect, the device transport engine may determine at least some of the state information for a transport stream. In this aspect, the host transport engine may not need to send comprehensive state information about a transport stream to the device transport engine. The device transport engine may instead infer at least some of the state information for a transport stream from the headers of data frames of that stream transmitted by the host transport engine.

In this further aspect a transport stream specific token may be provided to the device transport engine to indicate that the device transport engine is now responsible for the transport protocol processing of packets transmitted on that transport stream. The host transport engine may be configured to provide the token to the device transport engine. The host transport engine may be configured to revoke the token and continue the transport protocol processing of the transport stream itself.

Figure 3:
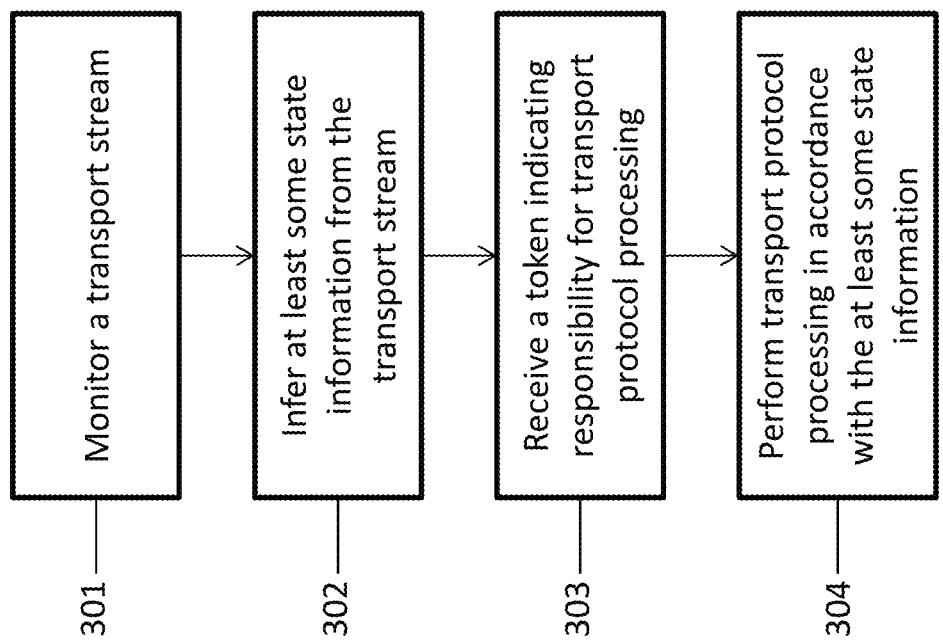
FIG. 3 is a flow diagram showing the method steps in of a further embodiment.

FIG. 3 is a flow diagram that shows the method steps in a system where at least some of the state information for a transport stream is inferred by the device transport engine.

In the example of FIG. 3, a host transport engine may establish a transport stream with a remote peer. For example, this may be in response to a request from a host application that wishes to communicate with the remote peer. The host transport engine may establish the transport stream and transmit at least one data frame corresponding to the transport stream to the remote end-point.

At step 301, the device transport engine may monitor the transport stream. It will be appreciated that the device transport engine may sit on the data path between the host transport engine and the remote peer. For example, in the embodiment of FIG. 1, the device transport engine sits on the data apparatus of the host transport engine between the host transport engine and the network. In the embodiment of FIG. 2, the device transport engine may sit at a network point between the host transport engine and the remote peer.

The device transport engine may inspect a header of at least one data frame transmitted by the host transport engine at step 302 and from this may infer at least some state information associated with the transport stream.

For example the header may contain information such as a packet destination, identity of the transport stream and/or the sequence number of the packet.

The device transport engine may store the inferred state information. It will be appreciated that the device transport engine may inspect each packet transmitted by the host transport engine and update the inferred state information accordingly. For example, the device transport engine may update a current packet sequence number as each packet is inspected. The device transport engine may continue to inspect the packets transmitted by the host transport engine for that transport stream until the device transport engine is passed a token at step 303.

At step 303, the device transport engine receives a token from the host indicating that the device transport engine is to carry out the transport protocol processing for the transport stream.

When the device transport engine receives the next data to be transmitted as part of the transport stream, the device transport engine may process the data in accordance with the transport protocol and the state information held by the device transport engine. This is shown at step 304.

At step 304, the device transport engine may receive payload data to be encapsulated and transmitted to the remote peer. It will be appreciated that the payload data may be an upper level protocol message, for example an application layer message generated by the host application or the device application. The device transport engine may process the payload data in accordance with the transport protocol and then pass the data on for further lower level processing before being transmitted to the remote peer.

In this further aspect, the payload data received at the device transport engine may be received from the host application or the device application. It will be appreciated that the host application may be instrumental in requesting and setting up a transport stream and further application level messages may then come from the host application or the device application. In some embodiments, both the host application and the device application may generate application level messages.

FIGS. 4 and 5 show examples of an application level message being generated by the host application and the device application respectively.

At step 401 in FIG. 4a, the device transport engine receives an application level message from the host application. At step 402, the device transport engine updates state information for the transport stream with which the application level message is associated. At step 402, the device transport engine processes the application level message.

FIG. 4b shows the method steps that may be carried out by the host transport engine in conjunction with the method of FIG. 4a. It will be appreciated that in the case of the application level message being generated by the application host, the host transport engine retains a copy of the payload before it is passed to the device transport engine. The copy may be placed on the retransmission queue of the host in anticipation of a retransmission of the payload being required.

At step 411, the host transport engine retains a copy of the payload from the host application being passed to the device transport engine. This copy may be placed in a retransmission queue of the host.

Optionally, at step 412, the host transport engine may update state information held at the host. For example, the host may update a sequence number of sent packets in dependence on the payload being sent to the device transport engine for transmission. By updating the state information, the host transport engine may be able to assume the responsibility for the protocol processing from the device transport engine and carry out the protocol processing with valid, up to date, state information.

FIGS. 5a and 5b show an example of the method steps that may be carried out by the device transport engine and host transport engine respectively when the application level message is generated by a device application. In this case, the message is generated at the device. The device may generate the message for example by completing fields in a template provided by the host transport engine. Although the host transport engine may have some prior knowledge of the message, for example the template the message adheres to, the host will not have full knowledge of the message as the device completes the message, for example by completing data fields.

At step 501 of FIG. 5a, the device transport application receives an application level message from the device application. At step 502, the device transport engine updates state information for the transport stream with which the message is associated. The host does not have full knowledge of the payload of the message as it was generated at the device so the device transport engine sends a copy of the application level message to the host at step 503.

In some embodiments the device transport engine may send a copy of the full message to the host. It will however be appreciated that in some embodiments, the host may have had some prior knowledge of the message, for example a template of the message. In this case, the device transport engine may be configured to send the host transport engine just enough information for the host transport engine to recreate the message and add it to its retransmit queue. For example, in the case of a template the device transport engine may send the host transport engine only information relating to the fields that the device transport engine completed along with for example an identity of the message template.

At step 504, the device transport engine proceeds to process the message.

The host transport engine receives the copy of the message at step 511 and places the message on its retransmission queue. Optionally at step 512, the host transport engine updates its state information for the transport stream. It will be appreciated that this step may be similar to step 412 of FIG. 4*b*.

It will be appreciated that the further aspect may be concerned with the transmit path between the host and a remote peer. By monitoring the transport stream at the connection setup by the host, the device may infer at least some of the state information from the transport stream. This state information may include the destination, identity and/or sequence number of a packet.

In some embodiments the device may require more state information than can be inferred from monitoring or sniffing the transmit data path of the transport stream. In such cases, the host may send a message to the device transport engine providing further state information. For example, the host may provide further state information with the token when it is passed to the device transport engine. In a further or additional embodiment, the device transport engine may infer further state information by monitoring both the transmit path and the receive path for the transport stream.

It will further be appreciated that both the device transport engine and the host transport engine may transmit data frames however only one engine may transmit a data frame having new payload at a time in order to keep the state information consistent. It will be appreciated that when the device has the token (and can send packets carrying payload) the host may still be able to send control packets such as TCP acknowledgements and retransmissions.

In order to provide this functionality, the host may pass the token to the device transport engine and when the device transport engine is to process the application level messages and revoke the token when the host is to process application level messages. It will be appreciated that the device transport engine may continue to monitor the transport stream even after the token is revoked in order to keep the state information at the device updated.

In embodiments in which the device transport engine is provided at a network device such as a network interface device or switch, the device transport engine is preferably coupled to the network by means of a physical layer signalling unit (a PHY) configured to perform the physical signalling of data packets over the network. The device transport engine is preferably provided with one or more layer 2 processing units (e.g. MACs) by means of which it interfaces with a PHY on the network side and, on the host side, a controller of the NIC or switch.

A device transport engine preferably cannot establish new transport streams.

In alternative embodiments, the device need not be a network device such as a NIC or switch but could be hardware coupled to such a network device. For example, the device application and device transport engine could be provided together or separately on one or more peripheral cards of a data processing system that are coupled to a NIC by means of a system bus or other interconnect.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A network interface card for interfacing a host device to a network, the network interface card comprising:
reconfigurable logic configured to:
receive state information for a data stream from the host device, wherein the state information includes a template data packet;
receive financial data from a trading exchange via the network;
in response to receipt of said financial data, generate a responsive message, wherein generating the responsive message comprises:
generating responsive values of financial trade data; and
generating the responsive message in accordance with said state information received from the host device for the data stream, said message comprising said responsive values of financial trade data and a checksum, said checksum being calculated and inserted into the responsive message by said reconfigurable logic, wherein generating the responsive message in accordance with said state information comprises combining payload data with the template data packet, the template data packet comprising one or more transmission control protocol (TCP) message headers including one or more values specific to the responsive message for one or more TCP parameters;
trigger output of said responsive message comprising the responsive values to said network for delivery to the trading exchange from which the financial data was received.

2. The network interface card of claim 1, wherein the reconfigurable logic is configured to determine the payload data that is to be included in the responsive message, wherein the payload data comprises the responsive values of financial trade data.

3. The network interface card of claim 2, wherein the reconfigurable logic is configured to generate the payload data responsive to a second message received from the network.

4. The network interface card of claim 2, wherein the reconfigurable logic is configured to generate the payload data by generating an upper-layer message to be included, at least in part, in the responsive message.

5. The network interface card of claim 4, wherein the reconfigurable logic is configured to generate the upper-layer message including source data, wherein the reconfigurable logic is configured to generate the source data.

6. The network interface card of claim 4, wherein the reconfigurable logic is configured to generate the upper-layer message including source data, wherein the reconfigurable logic is configured to receive the source data from the host device.

7. The network interface card of claim 1, wherein the reconfigurable logic is configured to receive, from the host device, at least a portion of the payload data to be included in the responsive message, wherein the payload data is separate from the state information.

8. The network interface card of claim 7, wherein the reconfigurable logic is configured to receive the at least the portion of the payload data prior to receiving the state information.

9. The network interface card of claim 8, wherein the reconfigurable logic is configured to receive the at least the portion of the payload data as part of receiving a configuration for a financial trading application to be executed by the reconfigurable logic to generate financial trading messages.

10. The network interface card of claim 1, wherein said state information indicates a state of a TCP stream at transmission of the responsive message.

11. The network interface card of claim 1, wherein the reconfigurable logic is configured to transmit to the host device a request for the state information.

12. The network interface card of claim 11, wherein the reconfigurable logic is configured to transmit the request for the state information in advance of the payload data of the responsive message being ready for transmission via the network.

13. The network interface card of claim 1, wherein the one or more TCP parameters include a sequence number for the data stream, source and/or destination ports for messages sent via the data stream, and/or configuration options set for the data stream.

14. The network interface card of claim 1, wherein:
the reconfigurable logic is configured to receive from the host device, a maximum segment size for the state information; and
the reconfigurable logic is configured to generate the responsive message from the payload data according to the maximum segment size.

15. The network interface card of claim 1, wherein:
the reconfigurable logic is configured to receive from the host device, as at least a part of the state information, an amount of payload data that the network interface card is permitted to transmit via a TCP stream; and
generating the responsive message in accordance with the state information comprises generating one or more messages, each including at least a portion of the payload data, according to the amount of the at least the portion of the payload data.

16. The network interface card of claim 15, wherein the reconfigurable logic is configured to receive the amount of payload data as a number of messages for transmission via the TCP stream and/or as an amount of data for transmission via the TCP stream.

17. The network interface card of claim 1, wherein:
the reconfigurable logic is configured to transmit a plurality of messages via a TCP stream over time; and
the reconfigurable logic is configured to generate each of the plurality of messages in accordance with the state information by, for a first message of the plurality of messages, combining first payload data for the first message with first TCP information, received from the host device, for the TCP stream, wherein the first TCP information for the first message is at least a part of the state information received from the host device and includes a first set of one or more values that are specific to the first message for one or more TCP parameters that vary between messages for the TCP stream.

18. The network interface card of claim 17, wherein the reconfigurable logic is configured to generate at least a second message of the plurality of messages for transmission via the TCP stream by combining second payload data with second TCP information for the TCP stream received from the host device, wherein the second TCP information is at least a part of the state information received from the host device and includes a second set of one or more values that are specific to the second message for the one or more TCP parameters that vary between messages for the TCP stream.

19. The network interface card of claim 1, wherein:
the reconfigurable logic is configured to execute a financial trading application to generate financial trading messages; and
the payload data comprises at least a portion of a financial trading message generated by the financial trading application executing on the reconfigurable logic.

20. The network interface card of claim 1, wherein the reconfigurable logic comprises a message engine configured to generate the responsive message for transmission over the network.

21. The network interface card of claim 1, wherein:
the reconfigurable logic is configured to generate the responsive message by generating a segment from the one or more TCP message headers and the payload data.

22. The network interface card of claim 1, wherein:
a data stream to which the responsive message belongs supports transmission of one or more messages according to a transport-layer network protocol; and
the one or more TCP message headers are in accordance with the transport-layer network protocol.

23. The network interface card of claim 1, wherein the reconfigurable logic is further configured to, following transmission of the message via the network by the network interface card, transmit a copy of the responsive message to the host device.

24. The network interface card of claim 1, further comprising:
a first interface configured to exchange data between the network interface card and a communications bus internal to the host device; and
a second interface configured to exchange data between the network interface card and the network.

25. The network interface card of claim 1, wherein the network interface card is a component of the host device and the reconfigurable logic is configured to generate the responsive message for transmission on behalf of the host device.

26. A method implemented at a network interface card, the network interface card comprising reconfigurable logic, the method comprising:
receiving state information for a data stream from a host device for the network interface card, wherein the state information includes a template data packet;
in response to receiving financial data from a trading exchange via a network,
generating, with the reconfigurable logic of the network interface card, responsive values of financial trade data,
generating a message in accordance with said state information for the data stream, said message comprising said responsive values of financial trade data wherein generating the responsive message in accordance with said state information comprises combining payload data with the template data packet, the template data packet comprising one or more TCP message headers including one or more values specific to the message for one or more TCP parameters; and triggering output of said message to said network for delivery to the trading exchange from which the financial data was received.

27. A system comprising:
a host device; and
a network interface card configured to couple the host device to a network and exchange financial messages between the host device and a trading exchange via network, the network interface card comprising:
reconfigurable logic configured to:
    receive state information for a data stream from the host device, wherein the state information includes a template data packet
    receive financial data from the trading exchange via the network;
    in response to receipt of said financial data,
        generate responsive values of financial trade data,
        generate a message in accordance with said state information, said message comprising said responsive values of financial trade data, wherein generating the message in accordance with the state information comprises combining payload data with the template data packet, the template data packet comprising one or more TCP message headers including one or more values specific to the message for one or more TCP parameters; and
        trigger output of said message to said network for delivery to the trading exchange from which the financial data was received.

28. At least one computer-readable non-transitory storage medium storing instructions that configure reconfigurable logic of a network interface card to perform a method, the network interface card being configured to couple a host device to a network and exchange via the network financial messages between the host device and a trading exchange, the method comprising:
receiving state information for a data stream from the host device, wherein the state information includes a template data packet;
in response to receiving financial data from the trading exchange via the network,
    generating responsive values of financial trade data;
    generating a message in accordance with said state information, said message comprising said responsive values of financial trade data, wherein generating the message comprises combining payload data with the template data packet, the template data packet comprising one or more TCP message headers including one or more values specific to the message for one or more TCP parameters; and
    triggering output of said message to said network for delivery to the trading exchange from which the financial data was received.

29. The network interface card of claim 1, wherein the data stream is a TCP stream.

30. The network interface card of claim 1, wherein the reconfigurable logic is further configured to receive from the host device a plurality of updates to said state information for the data stream.

31. The method of claim 26, wherein generating the message in accordance with said state information for the data stream comprises:
generating a checksum for the message based at least in part on the responsive values; and
including the checksum in the message.

32. The method of claim 26, wherein the method comprises performing with the reconfigurable logic the receiving the state information, the receiving the financial data, and the generating the message.

33. The method of claim 26, further comprising, with the network interface card:
receiving a plurality of updates to said state information for the data stream from the host device.

34. The system of claim 27, wherein the reconfigurable logic is configured to generate the message at least in part by:
generating a checksum for the message based at least in part on the responsive values; and
including the checksum in the message.

35. The system of claim 27, wherein the reconfigurable logic is further configured to receive a plurality of updates to said state information for the data stream from the host device.

36. The at least one computer-readable non-transitory storage medium of claim 28, wherein generating the message in accordance with said state information for the data stream comprises:
generating a checksum for the message based at least in part on the responsive values; and
including the checksum in the message.

37. The at least one computer-readable non-transitory storage medium of claim 28, wherein the method further comprises receiving a plurality of updates to said state information for the data stream from the host device.

38. The network interface card of claim 1, wherein the reconfigurable logic comprises a field programmable gay array (FPGA).

39. The method of claim 26, wherein the reconfigurable logic comprises an FPGA.

40. The system of claim 27, wherein the reconfigurable logic comprises an FPGA.

41. The at least one computer-readable non-transitory storage medium of claim 28, wherein the reconfigurable logic comprises an FPGA.

* * * * *